United States Patent
Habu

(10) Patent No.: US 10,363,926 B2
(45) Date of Patent: Jul. 30, 2019

(54) CONTROLLER FOR VEHICLE AND METHOD FOR CONTROLLING VEHICLE

(71) Applicant: HONDA MOTOR CO., LTD., Tokyo (JP)

(72) Inventor: Ikue Habu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/823,568

(22) Filed: Nov. 28, 2017

(65) Prior Publication Data
US 2018/0244266 A1 Aug. 30, 2018

(30) Foreign Application Priority Data
Feb. 28, 2017 (JP) .................. 2017-035604

(51) Int. Cl.
*B60W 20/50* (2016.01)
*B60R 16/033* (2006.01)
(Continued)

(52) U.S. Cl.
CPC .......... *B60W 20/50* (2013.01); *B60R 16/033* (2013.01); *B60W 10/06* (2013.01); *B60W 10/08* (2013.01);
(Continued)

(58) Field of Classification Search
CPC ...... B60W 20/50; B60W 20/13; B60W 10/06; B60W 10/08; B60W 2510/244; B60W 2710/06; B60R 16/033
(Continued)

(56) References Cited

U.S. PATENT DOCUMENTS

2003/0041592 A1* 3/2003 Nishioka ............... F01N 3/0842
60/277
2007/0267232 A1* 11/2007 Saito .................. F02M 25/0827
180/65.285
(Continued)

FOREIGN PATENT DOCUMENTS

| JP | 2008-45428 | 2/2008 |
| JP | 2008-189267 | 8/2008 |

(Continued)

OTHER PUBLICATIONS

Japanese Office Action for corresponding JP Application No. 2017-035604, dated Aug. 7, 2018.

*Primary Examiner* — Marthe Y Marc-Coleman
(74) *Attorney, Agent, or Firm* — Mori & Ward, LLP

(57) ABSTRACT

A controller for a vehicle includes failure diagnosis circuitry and drive control circuitry. The failure diagnosis circuitry is configured to perform a failure diagnosis of an internal combustion engine system while an internal combustion engine is in operation. The drive control circuitry is configured to operate the internal combustion engine in a charge depleting mode operation in which an electric motor mainly moves the vehicle while the internal combustion engine is not run only for charging a battery. The drive control circuitry is configured to run the internal combustion engine if a predetermined condition is satisfied in the charge depleting mode operation. The drive control circuitry is configured to continue running the internal combustion engine in order to perform the failure diagnosis even if the predetermined condition is unsatisfied while the internal combustion engine is run in the charge depleting mode operation.

17 Claims, 17 Drawing Sheets

(51) Int. Cl.
  *B60W 10/06*   (2006.01)
  *B60W 10/08*   (2006.01)
  *B60W 20/13*   (2016.01)
  *F01N 11/00*   (2006.01)
  *F02D 41/14*   (2006.01)
  *F02D 41/22*   (2006.01)
  *F02N 11/08*   (2006.01)
  *F02M 25/08*   (2006.01)
  *F02M 26/49*   (2016.01)
  *F02D 29/02*   (2006.01)
  *F02D 41/00*   (2006.01)
  *F02D 41/02*   (2006.01)
  *F02D 41/06*   (2006.01)
  *F02D 41/12*   (2006.01)
  *F02P 5/15*    (2006.01)

(52) U.S. Cl.
  CPC ............ *B60W 20/13* (2016.01); *F01N 11/00* (2013.01); *F02D 29/02* (2013.01); *F02D 41/1495* (2013.01); *F02D 41/22* (2013.01); *F02M 25/0809* (2013.01); *F02M 26/49* (2016.02); *F02N 11/0818* (2013.01); *F02N 11/0829* (2013.01); *B60W 2510/244* (2013.01); *B60W 2710/06* (2013.01); *F01N 2550/00* (2013.01); *F01N 2590/11* (2013.01); *F02D 41/008* (2013.01); *F02D 41/021* (2013.01); *F02D 41/0235* (2013.01); *F02D 41/068* (2013.01); *F02D 41/123* (2013.01); *F02D 41/1454* (2013.01); *F02D 2250/26* (2013.01); *F02N 11/0833* (2013.01); *F02N 2200/061* (2013.01); *F02N 2200/0801* (2013.01); *F02N 2200/0811* (2013.01); *F02P 5/1502* (2013.01); *Y02T 10/48* (2013.01)

(58) Field of Classification Search
  USPC ........................................................ 701/22
  See application file for complete search history.

(56) References Cited

U.S. PATENT DOCUMENTS

| | | | |
|---|---|---|---|
| 2012/0065826 A1* | 3/2012 | Kinoshita | B60K 6/445 701/22 |
| 2013/0144473 A1* | 6/2013 | Jeong | B60W 50/0205 701/22 |
| 2013/0297137 A1* | 11/2013 | Fushiki | B60K 6/445 701/22 |

FOREIGN PATENT DOCUMENTS

| | | |
|---|---|---|
| JP | 2010-179712 | 8/2010 |
| JP | 2012-20607 | 2/2012 |
| JP | 2014-043805 | 3/2014 |
| WO | WO2010/131341 | 11/2010 |
| WO | WO2012/101797 | 8/2012 |

* cited by examiner

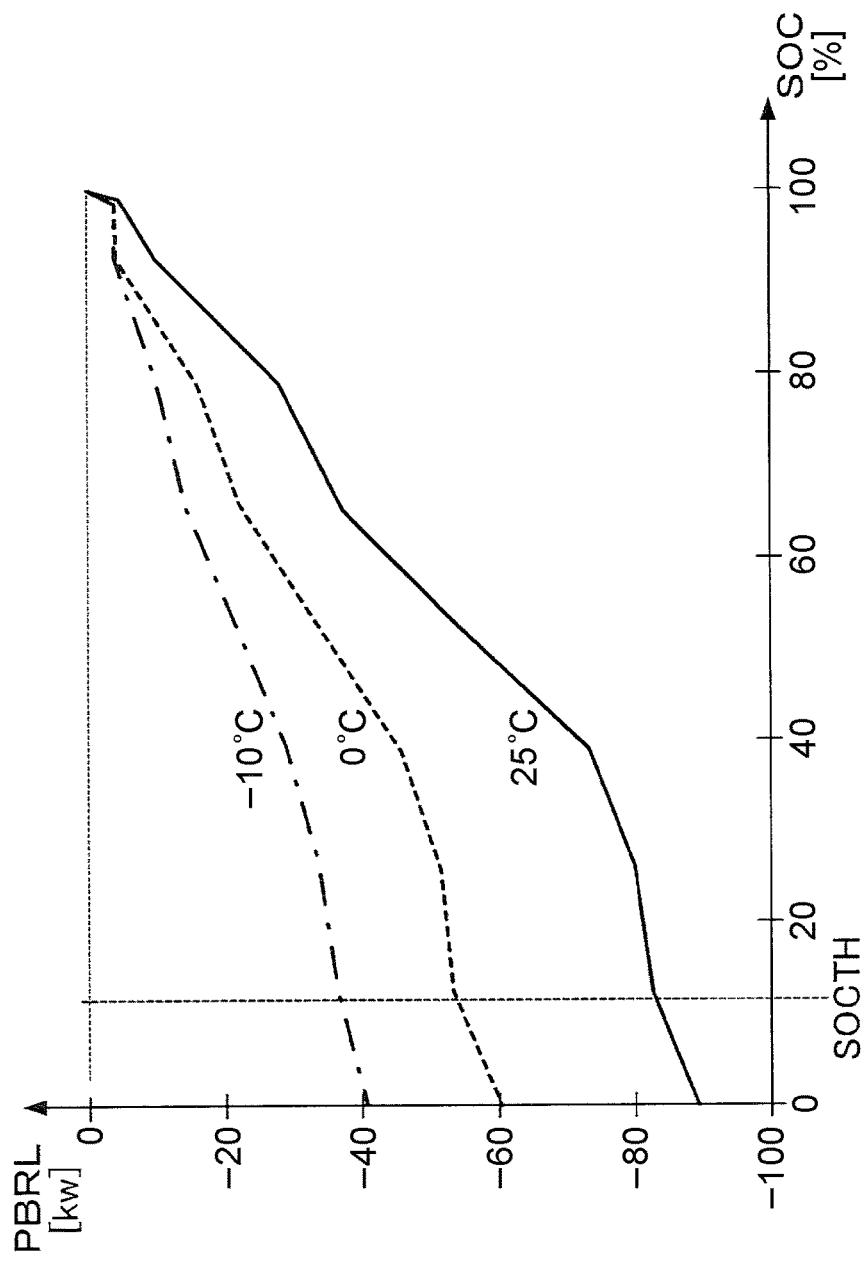

CONTROLLER FOR VEHICLE AND METHOD FOR CONTROLLING VEHICLE

CROSS-REFERENCE TO RELATED APPLICATIONS

The present application claims priority under 35 U.S.C. § 119 to Japanese Patent Application No. 2017-035604, filed Feb. 28, 2017, entitled "Controller for Vehicle." The contents of this application are incorporated herein by reference in its entirety.

BACKGROUND

1. Field

The present disclosure relates to a controller for a vehicle and a method for controlling a vehicle.

2. Description of the Related Art

Japanese Unexamined Patent Application Publication No. 2008-189267 discloses a controller for a hybrid vehicle which performs a failure diagnosis on an internal combustion engine while the internal combustion engine is warming up after its cold start. The controller prohibits the internal combustion engine from stopping warming up, unless the controller completes the failure diagnosis to be performed during the warming up. Thereby, the controller is capable of securely completing the failure diagnosis.

Japanese Unexamined Patent Application Publication No. 2014-43805 discloses a controller for a plug-in hybrid vehicle equipped with an internal combustion engine and an electric motor as a vehicle driving source. The controller controls the drive of the internal combustion engine and the electric motor by selecting either a charge depleting (CD) mode or a charge sustaining (CS) mode. In the charge depleting mode, the electric motor is mainly used as the vehicle driving source, but the internal combustion engine is not driven, to sustain the state of charge in the battery. This controller performs an abnormality determination process of: counting the number of occurrences of abnormal combustion in the internal combustion engine; and determining that the internal combustion engine is abnormal when the number of occurrences exceeds a determination threshold. In the charge depleting mode, the controller calculates a cumulative number of occurrences of abnormal combustion by adding the number of occurrences of abnormal combustion in the internal combustion engine in the past driving period to the number of occurrences of abnormal combustion in the internal combustion engine in the current driving period with taken into consideration that a ratio of the operating time of the internal combustion engine to the vehicle traveling time becomes lower, and determines that the internal combustion engine is abnormal when the cumulative number of occurrences of abnormal combustion exceeds a determination threshold.

SUMMARY

According to one aspect of the present invention, a controller for a vehicle includes failure diagnosis circuitry and drive control circuitry. The failure diagnosis circuitry is configured to perform a failure diagnosis of an internal combustion engine system of the vehicle while an internal combustion engine of the internal combustion engine system is in operation. The drive control circuitry is configured to operate the internal combustion engine in a charge depleting mode operation in which an electric motor mainly moves the vehicle while the internal combustion engine is not run only for charging a battery that is configured to supply electric power to the electric motor and to be charged by at least one of the internal combustion engine and an external power supply. The drive control circuitry is configured to run the internal combustion engine if a predetermined condition is satisfied in the charge depleting mode operation. The drive control circuitry is configured to continue running the internal combustion engine in order to perform the failure diagnosis even if the predetermined condition is unsatisfied while the internal combustion engine is run in the charge depleting mode operation.

According to another aspect of the present invention, a controller for a vehicle includes failure diagnosis means and drive control means. The failure diagnosis means are for performing a failure diagnosis of an internal combustion engine system of the vehicle while an internal combustion engine of the internal combustion engine system is in operation. The drive control means are for operating the internal combustion engine in a charge depleting mode operation in which an electric motor mainly moves the vehicle while the internal combustion engine is not run only for charging a battery that is configured to supply electric power to the electric motor and to be charged by at least one of the internal combustion engine and an external power supply. The drive control means are for running the internal combustion engine if a predetermined condition is satisfied in the charge depleting mode operation. The drive control means are for continuing running the internal combustion engine in order to perform the failure diagnosis even if the predetermined condition is unsatisfied while the internal combustion engine is run in the charge depleting mode operation.

According to further aspect of the present invention, a method for controlling a vehicle is disclosed. The method includes operating an internal combustion engine of an internal combustion engine system of the vehicle in a charge depleting mode operation in which an electric motor mainly moves the vehicle while the internal combustion engine is not run only for charging a battery that is configured to supply electric power to the electric motor and to be charged by at least one of the internal combustion engine and an external power supply. The method includes running the internal combustion engine if a predetermined condition is satisfied in the charge depleting mode operation. The method includes continuing running the internal combustion engine in order to perform a failure diagnosis of the internal combustion engine system even if the predetermined condition is unsatisfied while the internal combustion engine is run in the charge depleting mode operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a diagram illustrating a relationship between a state of charge in a high-voltage battery illustrated in FIG. 1 and power chargeable to the high-voltage battery.

DESCRIPTION OF THE EMBODIMENTS

Figure 1:
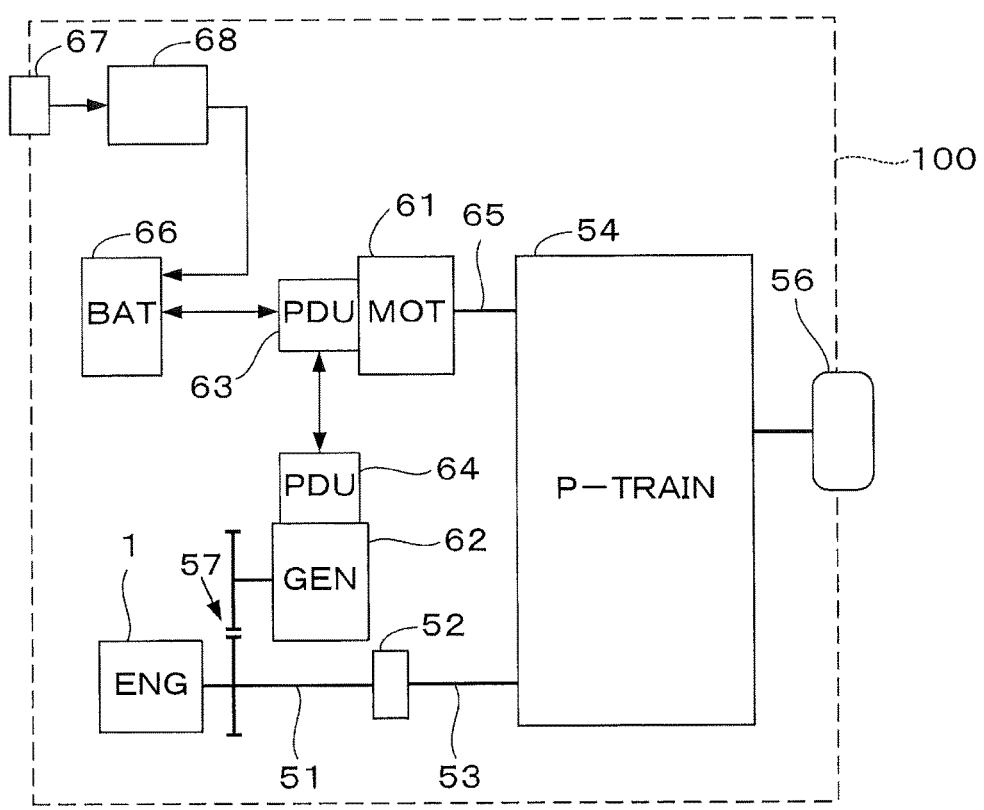
FIG. 1 is a diagram for explaining a configuration of a driving system which drives a plug-in hybrid vehicle according to an embodiment in the present disclosure.

The embodiments will now be described with reference to the accompanying drawings, wherein like reference numerals designate corresponding or identical elements throughout the various drawings.

Referring to the drawings, descriptions will be provided for an embodiment in the present disclosure.

FIG. 1 is a diagram for explaining a configuration of a driving system which drives a plug-in hybrid vehicle 100 according to the present disclosure. This vehicle driving system includes: an internal combustion engine (hereinafter referred to as an "engine") 1 and a motor (electric motor) 61 as a driving source; a generator 62 driven by the engine 1 or electric power from a high-voltage battery 66; a driving force transmission mechanism 54 which transmits driving force from the engine 1 and the motor 61 to driving wheels 56. An output shaft 51 of the engine 1 is connected to the driving force transmission mechanism 54 via a clutch 52 and a drive shaft 53. An output shaft 66 of the motor 61 is directly connected to the driving force transmission mechanism 54. The motor 61 works as a generator when regenerative operation is performed. Although not illustrated, the driving force transmission mechanism 54 includes a differential gear mechanism, and is configured to be capable of driving the two driving wheels 56.

The output shaft 51 of the engine 1 is connected to the generator 62 via a gear pair 57. The generator 62 generates power using the driving force from the engine 1.

The motor 61 and the generator 62 are electrically connected to power driving units (hereinafter abbreviated to "PDUs") 63, 64, respectively. The PDU 63 is connected to the PDU 64 and the high-voltage battery 66. The PDUs 63, 64 are connected to an electronic control unit (hereinafter abbreviated to "ECU," see FIG. 3) 5. The PDUs 63, 64 control operations of the motor 61 and the generator 62, respectively, and further control charge and discharge of the high-voltage battery 66.

The vehicle driving system further includes: an external power supply input terminal 67 to which a household AC power line can be connected. The external power supply input terminal 67 is connected to the high-voltage battery 66 via a power converter 68. An AC power (for example, a 100-volt AC power) inputted through the power supply input terminal 67 is converted into a DC power suitable to charge the high-voltage battery 66 by the power converter 68, which is then supplied to the high-voltage battery 66.

Figure 2A:
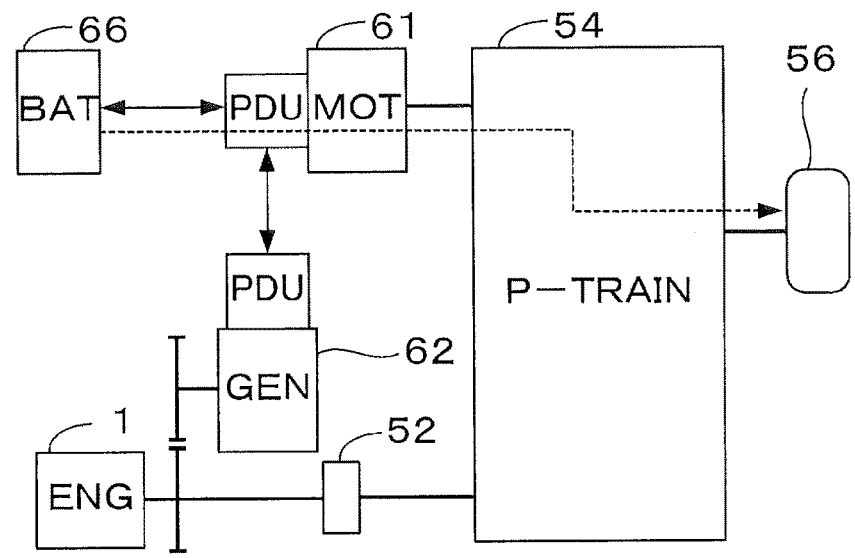
FIGS. 2A to 2D are diagrams for explaining drive modes of the vehicle driving system illustrated in FIG. 1.
Figure 2B:
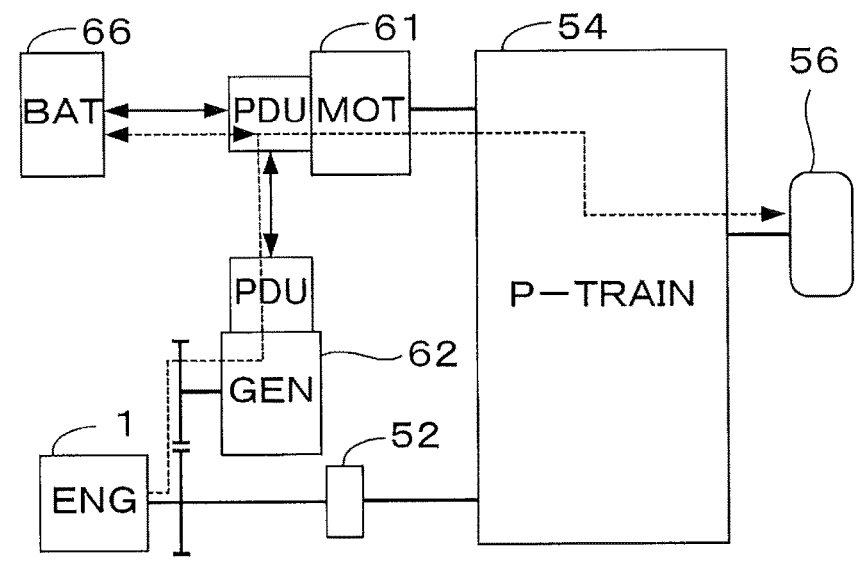
Figure 2C:
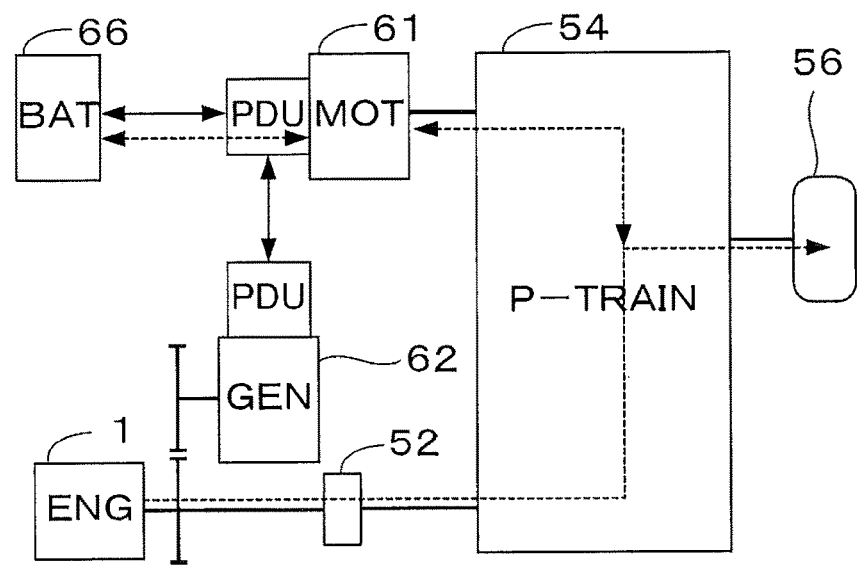
Figure 2D:
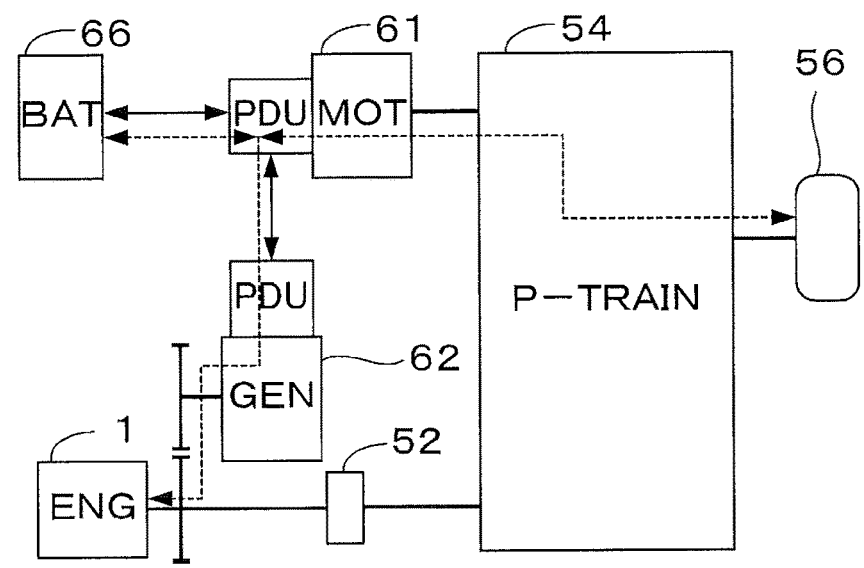

FIGS. 2A to 2D are diagrams for explaining drive modes of the vehicle driving system illustrated in FIG. 1. Because the components illustrated in FIGS. 2A and 2D are the same as those illustrated in FIG. 1, some of the reference signs are omitted from FIG. 2. Incidentally, the dashed lines drawn in FIGS. 2A to 2D represent transmission paths of the electric power or the driving force.

FIG. 2A shows a first motor drive mode in which the vehicle 100 is driven by output from the motor 61 which is driven by the electric power supplied from the high-voltage battery 66. In the first motor drive mode, the engine 1 is stopped, and the clutch 52 is released (disengaged).

FIG. 2B shows a second motor drive mode in which: the engine 1 is operated with the clutch 52 released; thereby, the generator 62 generates power; the thus-generated power drives the motor 61; and the output from the motor 61 runs the vehicle. In the second motor drive mode, when the power generated by the generator 62 is larger than that consumed by the motor 61, the high-voltage battery 66 is charged using the surplus power; and when the power generated by the generator 62 is smaller than that consumed by the motor 61, the power shortage is covered by discharge from the high-voltage battery 66.

FIG. 2C shows an engine drive mode in which the vehicle 100 is driven mainly by output from the engine 1. In the engine drive mode, the clutch 52 is engaged, and the output from the engine 1 is inputted into the driving force transmission mechanism 54, thus transmitted to the driving wheels 56. In the engine drive mode, torque surplus or shortage occurs depending on an increase or decrease in engine load. For this reason, when the torque surplus occurs, the motor 61 is operated as the generator to charge the high-voltage battery 66. On the other hand, when the torque shortage occurs, the output from the motor 61 assists engine output.

FIG. 2D shows a fuel supply stop operation mode in which: the clutch 52 is released; and the fuel supply to the engine 1 is stopped. In the fuel supply stop operation mode, either fuel cut motoring or an engine brake operation is performed. During fuel cut motoring, the engine 1 is driven by the motor 61 which is driven by electric power supplied from the high-voltage battery 66, and by the generator 62 which is used as a motor. The engine brake operation is applied to decelerate the vehicle. During the engine brake operation, the engine 1 is driven 1 with relatively large torque (torque larger than that for the fuel cut motoring) by making the motor 61 work as a generator, and by using the generator 61 as a motor. In the fuel supply stop operation mode, the high-voltage battery 66 is charged when the high-voltage battery 66 is chargeable. In this specification, "fuel cut operation" means fuel cut motoring. While fuel cut operation is being performed, failure diagnoses of accessory devices, such as sensors and an exhaust gas recirculation device, mounted on the internal combustion engine are performed as discussed later.

Figure 3:
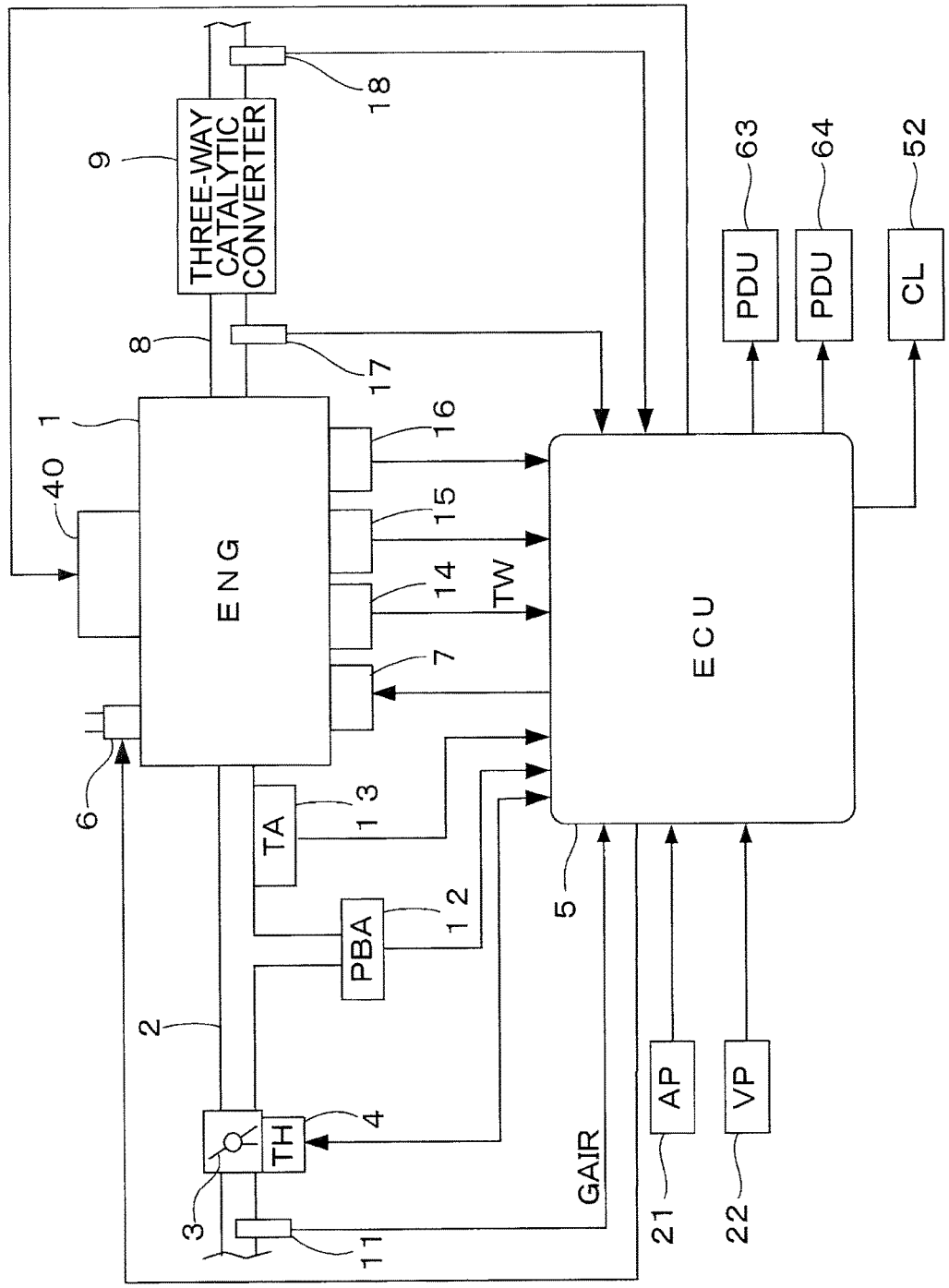
FIG. 3 is a diagram illustrating a configuration of a control system which controls an internal combustion engine, an electric motor and a generator illustrated in FIG. 1.

FIG. 3 is a diagram illustrating a configuration of a control system which controls the engine 1, and the motor 61/the generator 62. The ECU 5 controls the engine 1, the motor 61/the generator 62 via the PDUs 63, 64, and the engagement/release of the clutch 52. Incidentally, the ECU 5 is actually configured by connecting multiple ECUs via a network bus. Since, however, such a configuration is publicly known, FIG. 3 illustrates the ECU 5 as the single ECU.

The engine 1 includes a valve operation characteristic variable device 40 which changes the valve operating phase and so on of an intake valve (not illustrated) provided to each cylinder. A throttle valve 3 is provided in the middle of an intake passage 2 of the engine 1. A throttle valve drive unit 4 is attached to the throttle valve 3. The throttle valve drive unit 4 is connected to the ECU 5. The throttle valve drive unit 4 includes: a throttle actuator which drives the throttle valve 3; and a throttle valve open angle sensor. A detection signal from the throttle valve open angle sensor is supplied to the ECU 5. In addition, based on a drive signal from the ECU 5, a throttle valve open angle TH is controlled to be equal to a target open angle THCMD.

Each cylinder of the engine 1 is provided with a fuel injection valve 6 and an ignition plug 7. The fuel injection valve 6 is arranged in a way that enables the fuel injection valve 6 to directly inject fuel into a combustion chamber of the corresponding cylinder. Operations of the fuel injection valve 6 and the ignition plug 7 are controlled based on signals from the ECU 5, respectively.

An intake air flow rate sensor 11 which detects an intake air flow rate GAIR is provided upstream of the throttle valve 3. Furthermore, an intake air pressure sensor 12 which detects an intake air pressure PBA, and an intake air temperature sensor 13 which detects an intake air temperature TA are provided downstream of the throttle valve 3. The detection signals from these sensors are supplied to the ECU 5. A cooling water temperature sensor 14 which detects an engine cooling water temperature TW is attached to the main body of the engine 1. The detection signal from the cooling water temperature sensor 14 is supplied to the ECU 5.

A crank angle position sensor 15 and a cam angle position sensor 16 are connected to the ECU 5. The crank angle position sensor 15 detects a rotation angle of a crankshaft of the engine 1. The cam angle position sensor 16 detects a rotation angle of a camshaft (not illustrated) to which cams for driving the intake valves of the engine 1 are fixed. Signals depending on the rotation angle of the crankshaft and the rotation angle of the camshaft are supplied to the ECU 5. In each constant crank angle period (for example, each 6-degree period), the crank angle position sensor 15 generates one pulse (hereinafter referred to as a "CRK pulse"), and a pulse for specifying a predetermined angle position of the crankshaft. Meanwhile, the cam angle position sensor 16 generates a cam pulse depending on the rotation angle of the camshaft, and supplies the cam pulse to the ECU 5. These pulses are used to control various timings such as a fuel injection timing and an ignition timing, and to detect an engine speed (the number of engine revolutions) NE. Incidentally, an actual operating phase of the camshaft (an intake valve operating phase) CAIN can be detected from a relative relationship between the cam pulse outputted from the cam angle position sensor 12 and the CRK pulse outputted from the crank angle position sensor 11.

An exhaust passage 8 of the engine 1 is provided with a proportional oxygen concentration sensor 17 (hereinafter referred to a "LAF sensor 17"), a three-way catalytic converter 9 serving as an exhaust emission control device, and a binary oxygen concentration sensor 18 (hereinafter referred to as an "O2 sensor 18"). The detection signals from the LAF sensor 17 and the O2 sensor 18 are supplied to the ECU 5, and are applied to control the air-fuel ratio of the air-fuel mixture to be combusted in the engine 1.

An accelerator sensor 21, a vehicle speed sensor 22, and other sensors (such as an atmospheric pressure sensor and a lubricating oil temperature sensor) albeit not illustrated, are connected to the ECU 5. The accelerator sensor 21 detects an accelerator pedal depression amount (hereinafter referred to as an "accelerator pedal operation amount") AP in the vehicle 100 to be driven by the engine 1. The vehicle speed sensor 22 detects the running speed (vehicle speed) VP of the vehicle 10. The detection signals from the sensors are supplied to the ECU 5. The throttle valve drive unit 4 drives the throttle valve 3 open and closed. The throttle valve open angle TH is controlled by the ECU 5 depending on the accelerator pedal operation amount AP.

The valve operation characteristic variable device 40 includes: a first valve operation characteristic variable mechanism which changes the lift amount and open angle of the intake valve in two steps; a second valve operation characteristic variable mechanism which continuously changes the operating phase of the intake valve; and an actuator which drives the first and second valve operation characteristic variable mechanisms.

It should be noted that as accessory devices, publicly-known exhaust gas recirculation mechanism and evaporated fuel processing device, although not illustrated, are provided to the engine 1.

The ECU 5 includes: an input circuit which has functions such as a function of shaping the waveform of each input signal from the various sensors, a function of correcting an voltage level at a predetermined level, and a function of converting an analog signal value into a digital signal value; a central processing unit (hereinafter referred to as a "CPU"); a memory circuit which stores various operation programs to be executed by the CPU, the operation results, and the like; and an output circuit which supplies drive signals to the fuel injection valve 6, the ignition plug 7 and the like.

The ECU 5 further controls the operations of the motor 61 and the generator 62 via the PDUs 63, 64 depending on the travelling state of the vehicle 100 and the operating state of the engine 1.

In the embodiment, the vehicle 100 is driven in either a charge sustaining mode (hereinafter referred to as a "CS mode") operation or a charge depleting mode (hereinafter referred to as a "CD mode") operation. In the CS mode operation, the engine 1 is operated in a way that keeps the state of charge in the high-voltage battery 66 within a predetermined range. In the CD mode operation, the engine 1 is not activated to sustain the state of charge (SOC) in the high-voltage battery 66 within the predetermined range, and the vehicle 100 is driven mainly by using the motor 61 as the driving source.

Failure diagnoses of the engine 1 and its accessory devices such as the various sensors, the three-way catalytic converter, the exhaust gas recirculation device and the evaporated fuel processing device (hereinafter simply referred to as "engine-related failure diagnoses") need to be performed. In the plug-in hybrid vehicle, in a case where a period of time for which the engine is operated in the CD mode is relatively long, there is high likelihood that the needed engine-related failure diagnoses are not completed. This happens, for example, in a case where the user charges the battery at night and repeats short-distance drives in the daytime.

The embodiment aims to avoid a situation in which the needed failure diagnoses are not completed. To this end, in a case where, while in the CD mode operation, the engine 1 is activated because one of the predetermined condition for starting the operation of the engine is satisfied, the embodiment carries out a failure diagnosis operation for continuing the operation of the engine 1 to perform the engine-related failure diagnoses even after the condition for starting the operation of the engine becomes unsatisfied, and thereby completes the needed engine-related failure diagnoses. This makes it possible to securely perform the engine-related failure diagnoses, and to secure the appropriate execution frequency. In this specification, what is referred to simply as "failure diagnosis operation" means operating the engine 1 for the purpose of performing the engine-related failure diagnoses while in the CD mode.

The conditions for starting the operation of the engine are as follows:

(1) a requested vehicle drive torque TRQD (calculated as increasing as the accelerator pedal operation amount AP increases) exceeds a motor drive upper limit torque TRQMUL;

(2) an air conditioner (not illustrated) of the vehicle 100 requests the operation of the engine to be started for a heating purpose;

(3) the state of charge (SOC) (represented as a ratio to the fully-charged state, or the 100-percent charged state) of the high-voltage battery 66 becomes less than a lower limit SOC;

(4) the vehicle driver requests the battery to be charged;

(5) although a braking effect needs to be obtained from the power generating operation of the motor 61, the engine 1 needs to be driven using the generated power because the SOC in the high-voltage battery 66 is greater than an upper limit SOC;

(6) the temperature of the motor 61 exceeds an upper limit temperature;

(7) a time length for which the engine 1 remains out of operation exceeds a specified time; and (8) after the start of the failure diagnosis operation, the engine 1 is stopped because the vehicle speed VP decreases, and thereafter, the vehicle speed VP exceeds a motor drive upper limit vehicle speed VPEVU (an upper limit vehicle speed while the engine 1 is not in operation).

The engine-related failure diagnoses include: a catalyst temperature rise acceleration operation diagnosis to be performed while a catalyst temperature rise acceleration operation is being performed; a warming up diagnosis to be performed while the engine 1 is warming up; a normal operation diagnosis to be performed while a normal operation is being performed after the completion of the warm-up; and a fuel cut operation diagnosis to be performed while the engine 1 is operating under a fuel cut condition. The catalyst temperature rise acceleration operation is a type of warming up which increases the amount of intake air by making a target engine speed higher than an engine speed required for the normal warming up, and which delays an ignition timing IG from that required for the normal warming up. Thus, the catalyst temperature rise acceleration operation accelerates a rise in the temperature of the three-way catalytic converter 9. For this reason, the catalyst temperature rise acceleration operation is performed immediately after the cold start of the engine 1 to activate the three-way catalytic converter 9 earlier.

In the catalyst temperature rise acceleration operation diagnosis, failure diagnoses of the intake air temperature sensor 13 and the cooling water temperature sensor 14 are performed, for example. In the warming up diagnosis, failure diagnoses of the O2 sensor 18, an exhaust air recirculation control valve provided to the exhaust air recirculation mechanism, the valve operation characteristic variable device 40, and the like are performed. In the normal operation diagnosis, failure diagnoses such as a diagnosis of deterioration in responsiveness of the LAF sensor 17, a diagnosis of variation in the air-fuel ratio among the cylinders, a diagnosis of deterioration in the three-way catalytic converter 9 and a diagnosis of leaks in the exhaust air recirculation passage are performed. In the fuel cut operation diagnosis, failure diagnoses such as a diagnosis of detection characteristic abnormality of the LAF sensor 17, a diagnosis of deterioration in responsiveness characteristics of the O2 sensor 18, a diagnosis of abnormality of the flow rate of the exhaust air passing through the exhaust air recirculation passage and a diagnosis of leaks in the pipes of the evaporated fuel processing device are performed. While the engine-related failure diagnoses are being performed, the engagement of the clutch 52 is prohibited.

It should be noted that: the catalyst temperature rise acceleration operation is terminated when the activation (warm-up) of the three-way catalytic converter 9 is completed; and the catalyst temperature rise acceleration operation is not continued for the failure diagnoses.

Figure 4:
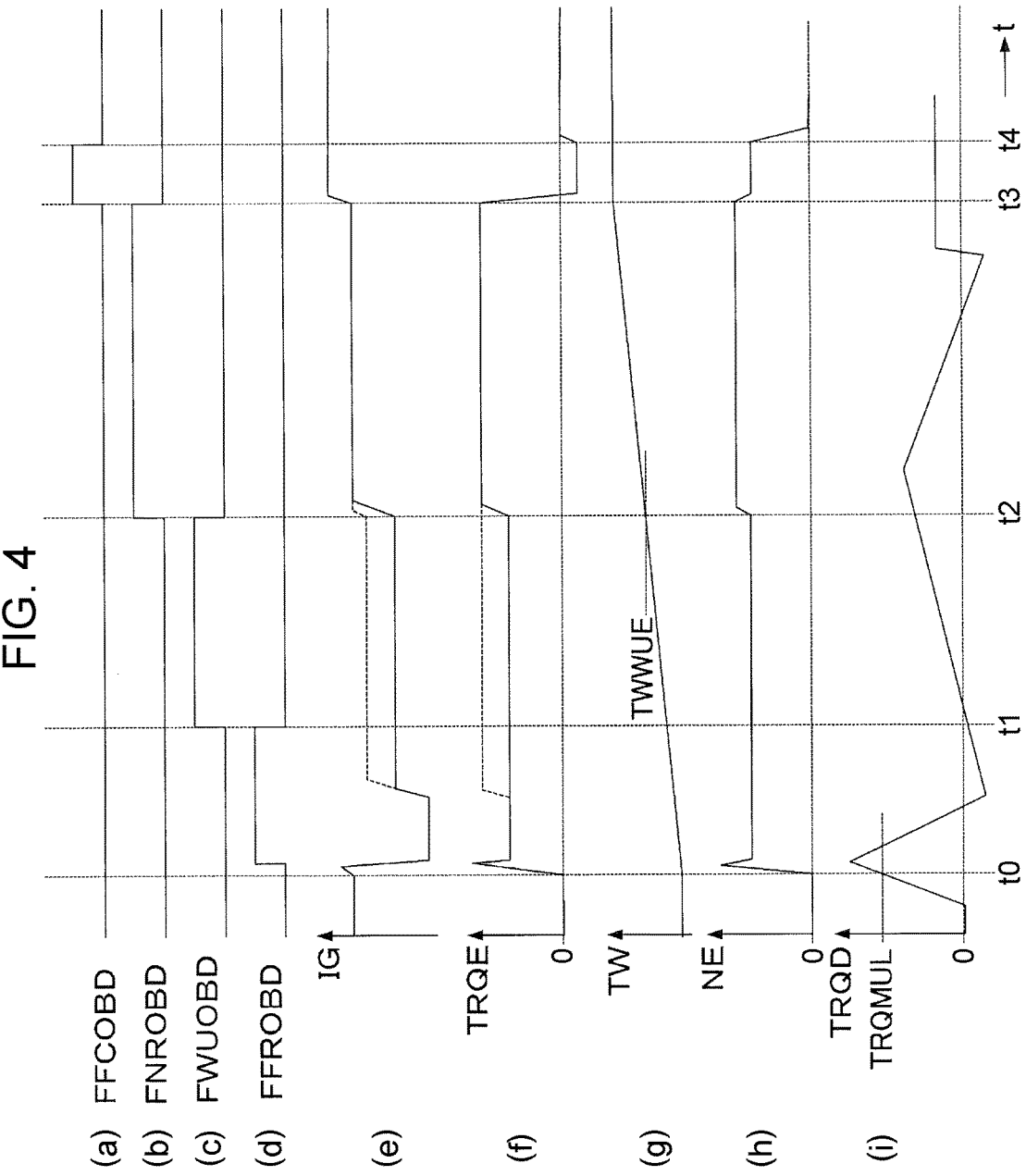
FIG. 4 is a time chart for explaining outlines of failure diagnoses of the internal combustion engine.

FIG. 4 is a time chart for explaining outlines of the engine-related failure diagnoses. (e) to (i) of FIG. 4 show the ignition timing IG, engine output torque TRQE, cooling water temperature TW, engine speed NE and requested vehicle drive torque TRQD change, respectively. At time t0 in FIG. 4, the above-mentioned condition (1) for starting the operation of the engine is satisfied, and the operation of the engine is started. (a) to (d) of FIG. 4 show that a fuel cut operation diagnosis execution flag FFCOBD, a normal operation diagnosis execution flag FNROBD, a warming up diagnosis execution flag FWUOBD, and a catalyst temperature rise acceleration operation diagnosis execution flag FFROBD change, respectively. The low level of each flag corresponds to "0," and the high level of each flag corresponds to "1" (This is the case in the other time charts).

Once the engine 1 is started, first of all, the catalyst temperature rise acceleration operation is performed. For this reason, the catalyst temperature rise acceleration operation diagnosis is performed. At time t1 when the activation of the three-way catalytic converter 9 is completed to end the catalyst temperature rise acceleration operation, the requested vehicle drive torque TRQD is smaller, and the condition (1) for starting the operation of the engine is accordingly not satisfied. Nevertheless, the operation of the engine 1 is continued, and the warming up diagnosis is started.

At time t2, the cooling water temperature TW reaches a warm-up end temperature TWWUE (for example, 75° C.) (in this case, the warming up diagnosis is completed at time t2). Thereafter, the amount of intake air is changed to make the engine output torque TRQE and the engine speed NE equal to their respective values suitable for the normal operation diagnosis, and the ignition timing TG is advanced. Subsequently, the normal operation diagnosis is performed.

At time t3, once the normal operation diagnosis is completed, the fuel cut operation diagnosis is started. At time t4, once the fuel cut operation diagnosis is completed, the operation of the engine 1 is completed. The fuel cut operation diagnosis is achieved by the fuel cut motoring in which: the supply of the fuel to the engine 1 is stopped; the generator 62 is operated as the motor; and the engine 1 is driven by the generator 62 operated as the motor.

FIG. 5 is a diagram illustrating an example of a relationship between the SOC in the high-voltage battery 66 and power chargeable to the high-voltage battery 66 (hereinafter referred to as a "chargeable power") PBRL. FIG. 5 shows that the chargeable power PBRL becomes larger as its absolute value becomes larger. The solid, dashed and chain lines drawn in FIG. 5 correspond to battery temperatures TBAT at 25° C., 0° C. and minus 10° C., respectively. It can be confirmed from FIG. 5 that: as the SOC becomes smaller, the chargeable power PBRL becomes larger; and as the battery temperature TBAT becomes lower, the chargeable power PBRL becomes smaller. Incidentally, when the battery temperature TBAT rises to, for example, approximately 58° C., the chargeable power PBRL is equal to, for example, approximately 6 kW, and the high-voltage battery 66 is hardly chargeable. The operation in the CD mode is allowed, for example, while the SOC is within a range greater than a threshold SOCTH illustrated in FIG. 5.

In the case where the above-discussed failure diagnosis operation is performed, particularly in the case where the normal operation diagnosis is performed, the output torque TRQE of the engine 1 needs to be set at a relatively large torque which is determined depending on the contents of the failure diagnoses. For this reason, one of the conditions for performing the normal operation diagnosis is that the chargeable power PBRL of the high-voltage battery 66 is somewhat larger. Actually, the SOC is required to be equal to or less than an upper SOC threshold SOCNRUL (see S53 in FIG. 7). The upper SOC threshold SOCNRUL is set such that when the battery temperature TEAT is, for example, within a normal temperature range equal to or lower than 55° C., the upper SOC threshold SOCNRUL becomes lower as the battery temperature TBAT becomes lower.

It should be noted that the dashed lines drawn in (e) and (f) of FIG. 4 represent actions corresponding to the case where the operation of the engine 1 is started in the CS mode but not in the CD mode. In the CS mode, since the SOC in the high-voltage battery 66 is relatively small (the chargeable power PBRL is relatively large), the output torque TRQE of the engine 1 can be increased earlier by advancing the ignition timing IG. On the other hand, in the CD mode, since the SOC in the high-voltage battery 66 is relatively large (the chargeable power PBRL is relatively small), the ignition timing IG until the completion of the warming up is set at a timing delayed from an optimum ignition timing which maximizes the engine output torque TRQE.

Figure 6A:
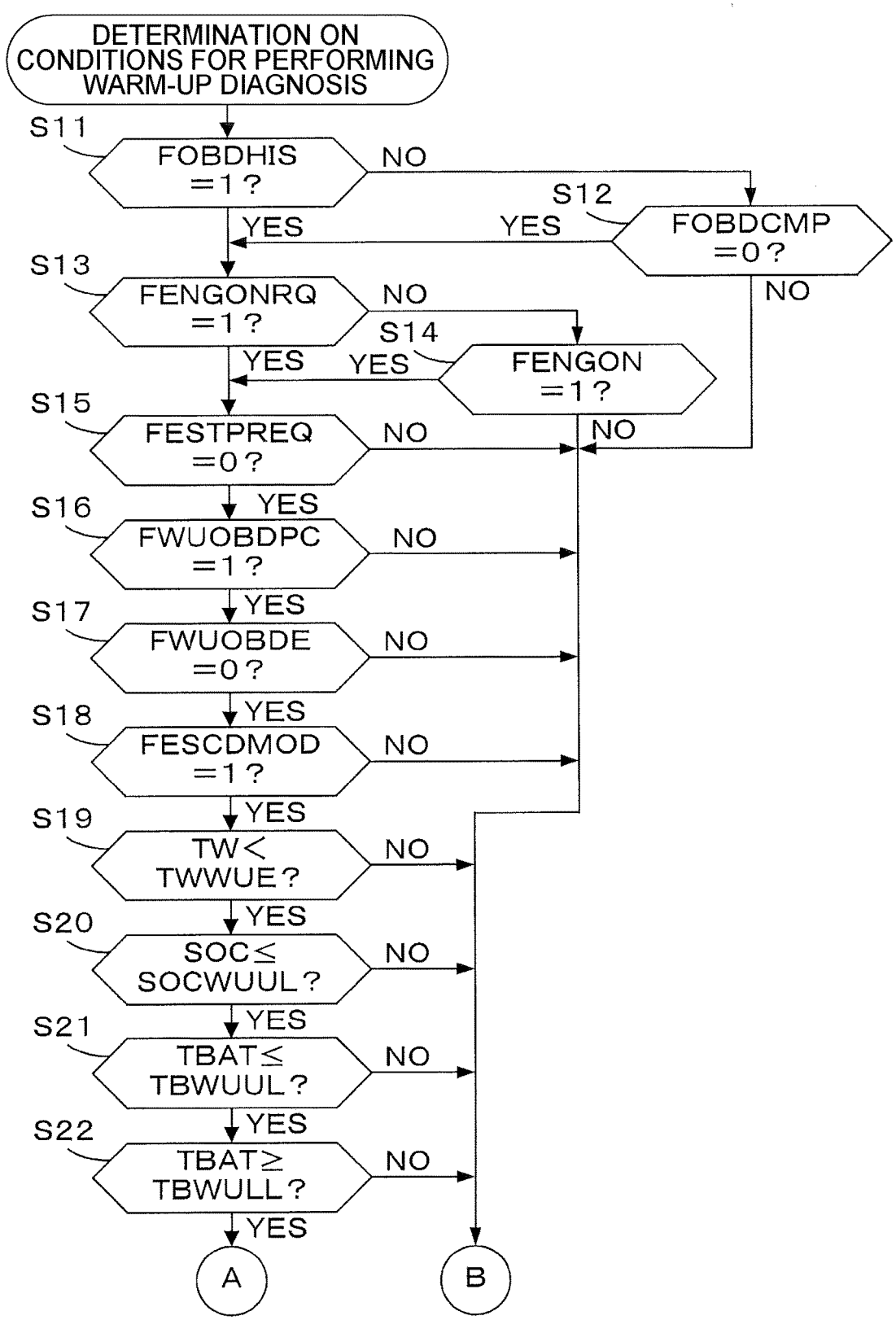
FIGS. 6A and 6B are flowcharts of a process of determining conditions for performing a warming up diagnosis.
Figure 6B:
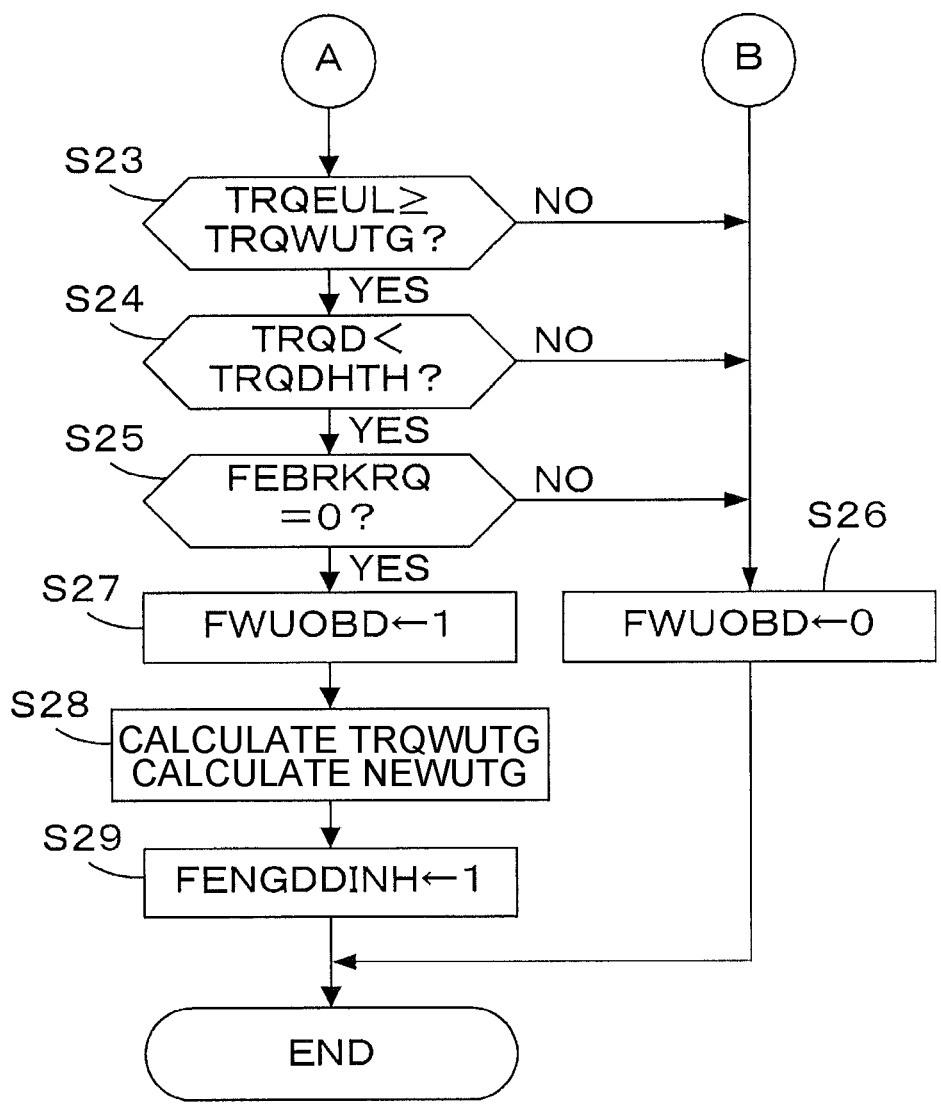

FIGS. 6A and 6B are flowcharts of a process of determining whether the conditions for performing the warming up diagnosis are satisfied. The ECU 5 performs this process at constant time intervals.

In step S11, the ECU 5 determines whether a failure diagnosis operation history flag FOBDHIS is at "1." The failure diagnosis operation history flag FOBDHIS is set at "1" when the failure diagnosis operation is performed during a previous one driving period which is defined as being from the start to end of the driving of the vehicle 100. If the answer in step S11 is negative (NO), that is to say, if no failure diagnosis operation is performed during the previous driving period, the ECU 5 determines whether a failure diagnosis completion flag FOBDCMP is at "0" (in step S12). The failure diagnosis completion flag FOBDCMP is set at "1" when all the failure diagnoses to be performed are completed during the previous driving period: If the answer in step S12 is negative (NO), that is to say, if all the failure diagnoses are completed, the warming up diagnosis need not be performed during the current driving period. For this reason, the ECU 5 determines that the corresponding condition for performing the warming up diagnosis is not satisfied, and proceeds to step S26, where the ECU 5 sets the warming up diagnosis execution flag FWUOBD at "0."

If the answer in step S11 or S12 is positive (YES), that is to say, if the failure diagnosis operation is performed during the previous driving period, or if no failure diagnosis operation is performed during the previous driving period and all the failure diagnoses are not completed during the previous driving period, the ECU 5 proceeds to step S13, where the ECU 5 determines whether an engine on request flag FENGONRQ for requesting the start of the operation of the engine 1 is at "1." The engine on request flag FENGONRQ is set at "1" when one of the above-discussed conditions for starting the operation of the engine is satisfied.

If the answer in step S13 is negative (NO), the ECU 5 determines whether an engine on flag FENGON is at "1" (in step S14). The engine on flag FENGON is set at "1" when the engine on request flag FENGONRQ is at "1," when an engine brake request flag FEBRKRQ is at "1," or when the catalyst temperature rise acceleration operation diagnosis, the warming up diagnosis, the normal operation diagnosis or the fuel cut operation diagnosis is performed.

If the answer in step S14 is negative (NO), the ECU 5 proceeds to step S26. If the answer in step S14 is positive (YES), the ECU 5 proceeds to step S15. In steps S15 to S25, the ECU 5 sequentially makes the following determinations. If a determination result in one of steps S15 to S25 is positive (YES), the ECU 5 proceeds to the next step. If the determination result in one of steps S15 to S25 is negative (NO), the ECU 5 determines that the corresponding condition for performing the warming up diagnosis is not satisfied, and proceeds to step S26.

In step S15, the ECU 5 determines whether an engine stop request flag FESTPREQ is at "0." The engine stop request flag FESTPREQ is set at "1" when a failure is detected by the failure diagnoses and the engine 1 needs to be stopped.

In step S16, the ECU 5 determines whether a warming up diagnosis precondition flag FWUOBDPC is at "1." The warming up diagnosis precondition flag FWUOBDDC is set at "1" when a precondition used to allow the warming up diagnosis to be performed, and not determined in this process (for example, a condition that the sensors used for the failure diagnoses are determined as being normal) is satisfied.

In step S17, the ECU 5 determines whether a warming up diagnosis end flag FWUOBDE is at "1." The warming up diagnosis end flag FWUOBDE is set at "1" when all the failure diagnoses to be performed in the warming up diagnosis are completed.

In step S18, the ECU 5 determines whether a CD mode start flag FESCDMOD is at "1." The CD mode start flag FESCDMOD is at "1," when the operation mode at the time of starting the current operation of the engine 1 is the CD mode.

In step S19, the ECU 5 determines whether the cooling water temperature TW is lower than a warm-up end temperature TWWUE.

In step S20, the ECU 5 determines whether the SOC is not greater than a warming up execution upper limit value SOCWUUL (for example, 95%).

In step S21, the ECU 5 determines whether the battery temperature TBAT is not higher than a warming up execution upper limit temperature TBWUUL (for example, 50° C.).

In step S22, the ECU 5 determines whether the battery temperature TBAT is not lower than a warming up execution lower limit temperature TBWULL (for example, minus 10° C.).

In step S23, the ECU 5 determines whether an upper limit engine output torque TRQEUL is not less than a warming up target torque TRQWUTG. The upper limit engine output torque TRQEUL is set such that it becomes smaller as the chargeable power PBRL of the high-voltage battery 66 becomes lower (the SOC becomes higher).

In step S24, the ECU 5 determines whether the requested vehicle drive torque TRQD is less than a high output request threshold TRQDHTH. The high output request threshold TRQDHTH corresponds to a maximum value of the vehicle drive torque which can be outputted by electric power from the high-voltage battery 66. When the requested vehicle drive torque TRQD is equal to or greater than the high output request threshold TRQDHTH, the engine 1 cannot be operated in a steady state suitable for the failure diagnoses. The drive which increases the amount of power generated by the generator 62 is performed.

In step S25, the ECU 5 determines whether the engine brake request flag FEBRKRQ is at "0." The engine brake request flag FEBRKRQ is set at "1" when the engine 1 needs to be driven using electric power generated by the motor 61 because the chargeable power PBRL of the high-voltage battery 66 is relatively small (the engine 1 needs to be driven by the generator 62 which is made to work as the motor).

If the answer in step S25 is positive (YES), the ECU 5 determines the corresponding conditions for performing the warming up diagnosis is satisfied, and sets the warming up diagnosis execution flag FWUOBD at "1" (in step S27). The ECU 5 further calculates the warming up target torque TRQWUTG and a warming up target number of revolutions NEWUTG (in step S28). While the warming up diagnosis is being performed, the amount of intake air, the amount of supplied fuel, and the ignition timing are controlled such that: the output torque TRQE of the engine 1 is equal to the warming up target torque TRQWUTG; and the number of engine revolutions NE is equal to the warming up target number of revolutions NEWUTG.

In step S29, the ECU 5 sets an engine direct drive inhibition flag FENGDDINH at "1." While the failure diagnosis operation is being performed, the operating state of the engine 1 needs to be kept in the steady operating state. For this reason, the engine direct drive inhibition flag FENGDDINH is set at "1," and the engine direct drive in which the engine drives the driving wheels 56 by engaging the clutch 52 is inhibited. Incidentally, the engine direct drive inhibition flag FENGDDINH is reset at "0" when the failure diagnosis operation of the engine 1 is completed.

Figure 7:
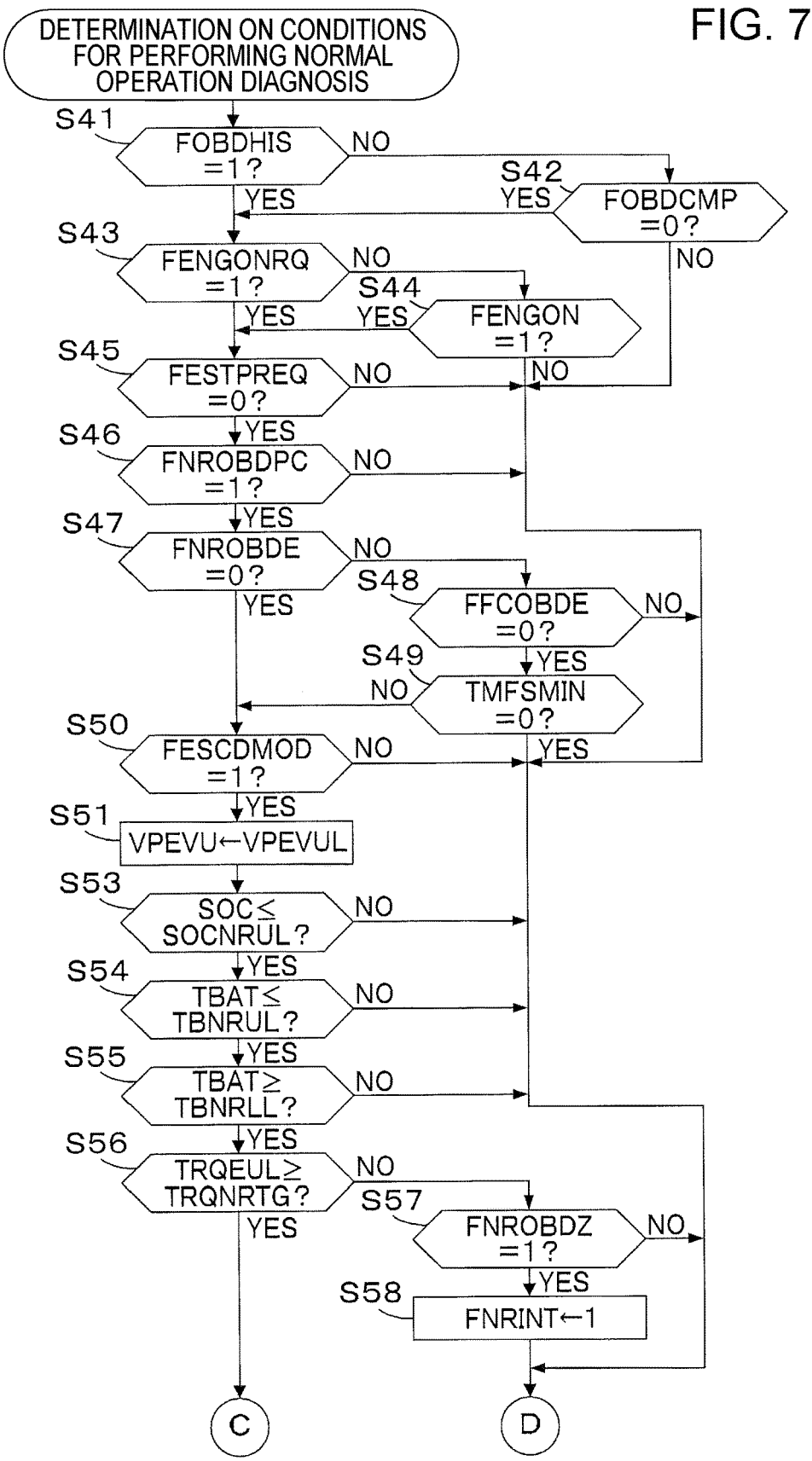
FIG. 7 is a flowchart of a process of determining conditions for performing a normal operation diagnosis.
Figure 8:
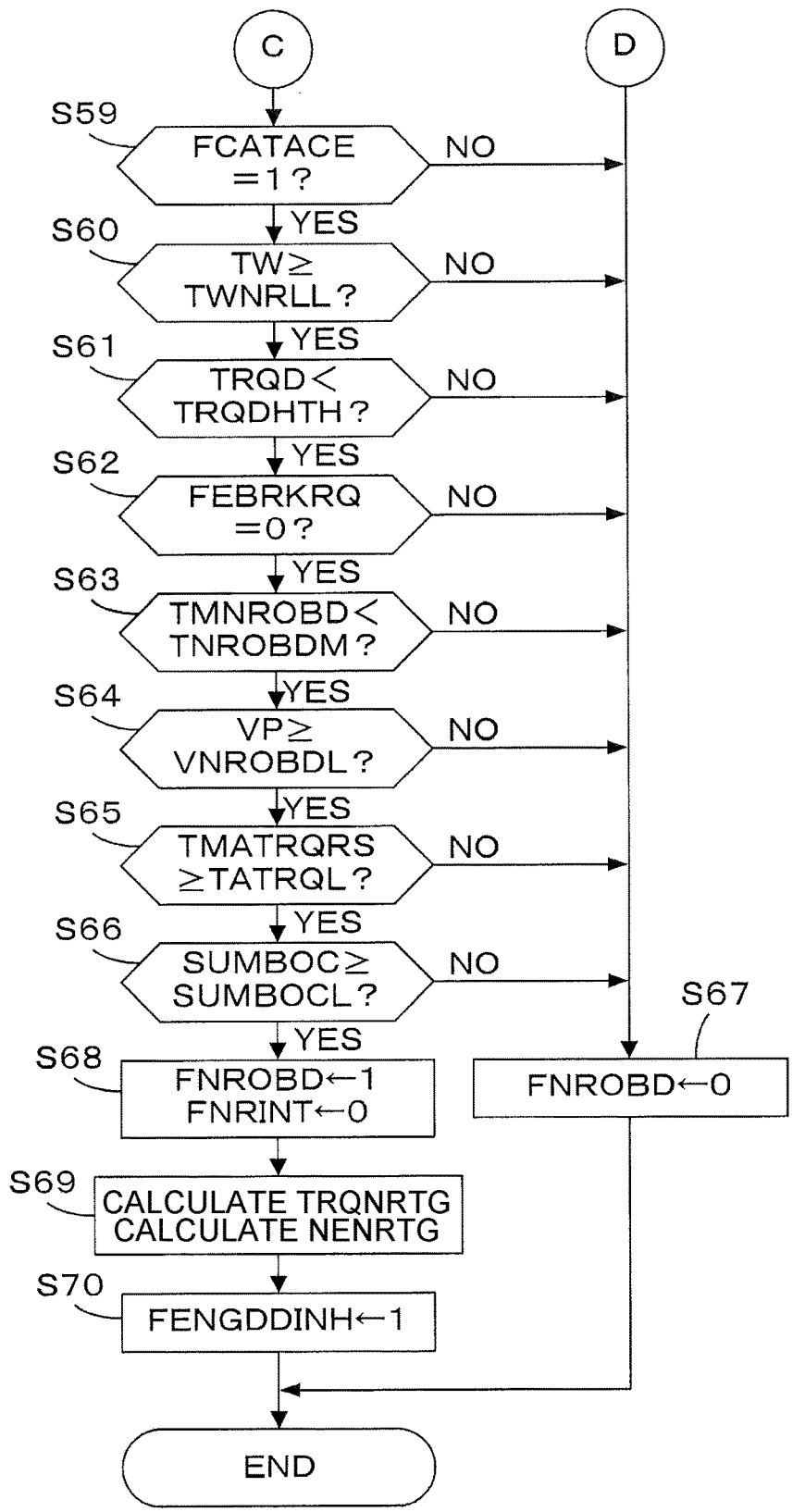
FIG. 8 is another flowchart of the process of determining conditions for performing the normal operation diagnosis.

FIGS. 7 and 8 are flow charts of a process of determining whether the conditions for performing the normal operation diagnosis are satisfied. The ECU 5 performs this process at constant time intervals.

Steps S41 to S45 are the same as steps S11 to S15 in FIG. 6A, and determine whether the same conditions as in steps S11 to S15 are satisfied. In the answer in step S42, S44 or S45 is negative (NO), the ECU 5 determines that the corresponding condition for performing the normal operation diagnosis is not satisfied, and proceeds to step S67 (FIG. 8).

If the answer in step S45 is positive (YES), the ECU 5 determines whether a normal operation diagnosis precondition flag FNROBDPC is at "1" (in step S46). The normal operation diagnosis precondition flag FNROBDPC is set at "1" when a precondition used to allow the normal operation diagnosis to be performed, and not determined in this process (for example, a condition that the sensors used for the failure diagnoses are determined as being normal) is satisfied. If the answer in step S46 is negative (NO), the ECU 5 determines that the corresponding condition for performing the normal operation diagnosis is not satisfied, and proceeds to step S67.

If the answer in step S46 is positive (YES), the ECU 5 determines whether a normal operation diagnosis end flag FNROBDE is at "1" (in step S47). The normal operation diagnosis end flag FNROBDE is set at "1" when all the failure diagnoses to be performed for the normal operation diagnosis are completed. If the answer in step S47 is negative (NO), the ECU 5 determines whether a fuel cut operation diagnosis end flag FFCOBDE is at "0" (in step S48). The fuel cut operation diagnosis end flag FFCOBDE is set at "1" when all the failure diagnoses to be performed for the fuel cut operation diagnosis are completed. If the answer in step S48 is negative (NO) and the fuel cut operation diagnosis is completed, the ECU 5 proceeds to step S67.

If the answer in step S48 is positive (YES) and the fuel cut operation diagnosis is not completed, the ECU 5 determined whether the value of a minimum fuel supply operation time timer TMFSMIN is at "0" (in step S49). The minimum fuel supply operation time timer TMFSMIN is a countdown timer whose initial value is set at a minimum fuel supply operation time TFSMIN (for example, 10 seconds), and counts seconds backward to zero while the engine 1 is being operated while supplied with fuel. To put it specifically, when the minimum fuel supply operation time timer TMFSMIN is at "0," the fuel supply operation time is equal to or greater than the minimum fuel supply operation time TFSMIN. The minimum fuel supply operation time timer TMFSMIN is set at the initial value (=TFSMIN) when the supply of fuel to the engine 1 is stopped.

If the answer in step S47 is positive (YES) and the normal operation diagnosis is not completed, or if the answer in step S49 is negative (NO) and the fuel supply operation time is less than the minimum fuel supply operation time TFSMIN, the ECU 5 proceeds to step S50, where the ECU 5 makes the same determination as in step S18 in FIG. 6A. If the answer in step S50 is positive (YES), the ECU 5 proceeds to step S51, where the ECU 5 sets the motor drive upper limit vehicle speed VPEVU at a predetermined low vehicle speed VPEVUL (for example, 50 km/h). The motor drive upper limit vehicle speed VPEVU is an upper limit vehicle speed for driving the vehicle 100 using the motor 61 without operating the engine 1. When the vehicle speed VP exceeds the motor drive upper limit vehicle speed VPEVU, the condition (8) for starting the operation of the engine is satisfied. In this embodiment, the predetermined low vehicle speed VPEVUL is set at a vehicle speed which is equal to a normal operation diagnosis lower limit vehicle speed VNROBDL. The motor drive upper limit vehicle speed VPEVU is reset at a predetermined high vehicle speed VPEVUH (for example, 150 km/h) at a time when the failure diagnosis operation of the engine 1 is completed.

If the answer in step S50 is negative (NO), the ECU 5 proceeds to step S67 (FIG. 8), where the ECU 5 sets the normal operation diagnosis execution flag FNROBD at "0."

In the subsequent steps S53 to S55, the ECU 5 sequentially makes the following determinations. If a determination result in one of steps S53 to S55 is positive (YES), the ECU 5 proceeds to the next step. If the determination result in one of steps S53 to S55 is negative (NO), the ECU 5 determines that the corresponding condition for performing the normal operation diagnosis is not satisfied, and proceeds to step S67.

In step S53, the ECU 5 determines whether the SOC is not greater than a normal operation execution upper limit value SOCNRUL (for example, 90%). The normal operation execution upper limit value SOCNRUL is set at a value which is smaller than the warming up execution upper limit value SOCWUUL. This is because the amount of electric power generated by the engine operation is greater during the normal operation than during the warming up.

In step S54, the ECU 5 determines whether the battery temperature TBAT is not higher than a normal operation execution upper limit temperature TBNRUL (for example, 50° C.). The normal operation execution upper limit temperature TBNRUL is set at a temperature which is equal to or lower than the warming up execution upper limit temperature TBWUUL.

In step S55, the ECU 5 determines whether the battery temperature TBAT is not lower than a normal operation execution lower limit temperature TBNRLL (for example, minus 10° C.). The normal operation execution lower limit temperature TBNRLL is set at a temperature which is equal to or higher than the warming up execution lower limit temperature TBWULL.

If the answer in step S55 is positive (YES), the ECU 5 determines whether the upper limit engine output torque TRQEUL is not less than a normal operation target torque TRQNRTG (in step S56). The normal operation target torque TRQNRTG is set corresponding to an engine operating point which is suitable for the multiple failure diagnoses included in the normal operation diagnosis (which is defined using the engine output torque TRQE and the number of engine revolutions NE). If the answer in step S56 is positive (YES), the ECU 5 proceeds to step S59.

If the answer in step S56 is negative (NO), the ECU 5 determines whether a normal operation diagnosis execution flag previous value FNROBDZ is at "1" (in step S57). If the answer in step S57 is negative (NO), the ECU 5 immediately proceeds to step S67. If the answer in step S57 is positive (YES), that is to say, if while the normal operation diagnosis is being performed, the answer in step S56 becomes negative (NO) to satisfy the condition for stopping the normal operation diagnosis, the ECU 5 sets a stop condition flag FNRINT at "1" (in step S58), and proceeds to step S67.

In the subsequent steps S59 to S66, the ECU 5 sequentially makes the following determinations. If a determination result in one of steps S59 to S66 is positive (YES), the ECU 5 proceeds to the next step. If the determination result in one of steps S59 to S66 is negative (NO), the ECU 5 determines that the corresponding condition for performing the normal operation diagnosis is not satisfied, and proceeds to step S67.

In step S59, the ECU 5 determines whether a catalyst activation end flag FCATACE is at "1." The catalyst activation end flag FCATACE is set at "1" when the activation (warm-up) of the three-way catalytic converter 9 is completed.

In step S60, the ECU 5 determines whether the cooling water temperature TW is not lower than a normal operation diagnosis execution lower limit temperature TWNRLL. The normal operation diagnosis execution lower limit temperature TWNRLL is set at a temperature which is equal to or lower than the warm-up end temperature TWWUE.

In step S61, the ECU 5 makes the same determination as in step S24 in FIG. 6B.

In step S62, the ECU 5 makes the same determination as in step S25 in FIG. 6B.

In step S63, the ECU 5 determines whether the value of a normal operation diagnosis execution timer TMNROBD is less than a maximum normal operation diagnosis time TNROBDM (for example, 120 seconds). The normal operation diagnosis execution timer TMNROBD is an up-count timer which measure the length of time for which the normal operation diagnosis is performed. Once the normal operation diagnosis is interrupted, the normal operation diagnosis execution timer TMNROBD holds the timer value during the interruption period. Once the normal operation diagnosis is resumed, the normal operation diagnosis execution timer TMNROBD starts counting second forward from the timer value. The normal operation diagnosis execution timer TMNROBD is reset when the normal operation diagnosis is completed, or when the normal operation diagnosis is stopped because the timer value reaches a maximum normal operation diagnosis time TNROBDM.

In step S64, the ECU 5 determines whether the vehicle speed VP is not less than the normal operation diagnosis lower limit vehicle speed VNROBDL (for example, 50 km/h). The normal operation diagnosis lower limit vehicle speed VNROBDL is a lower limit value of the vehicle speed VP which enables the normal operation diagnosis to be performed.

In step S65, the ECU 5 determines whether the value of a post-torque-restraint timer TMATRQRS is not less than a predetermined resumption permission time TATRQL (for example, 60 seconds). The post-torque-restraint timer TMATRQRS is an up-count timer which measures how much time has passed since the interruption of the normal operation diagnosis (hereinafter referred to as "torque restraint interruption") which results from the satisfaction of the condition for stopping the normal operation diagnosis (the YES answer in step S56) after the start of the normal operation diagnosis.

In step S66, the ECU 5 determines whether a battery output current integrated value SUMBOC is not less than a resumption permission current threshold SUMBOCL. The battery output current integrated value SUMBOC is calculated by integrating the output current values of the high-voltage battery 66 at constant intervals from a time of the torque restraint interruption.

If the answer in step S66 is positive (YES), the ECU 5 determines that the corresponding condition for performing the normal operation diagnosis is satisfied, as well as sets the normal operation diagnosis execution flag FNROBD at "1," and sets an stop condition flag FNRINT at "0" (in step S68). In step S69, the ECU 5 calculates a normal operation target torque TRQNRTG and a normal operation target number of revolutions NENRTG of the engine 1. While the normal operation diagnosis is being performed, the amount of intake air, the amount of supplied fuel and the ignition timing are controlled such that: the output torque TRQE of the engine 1 is equal to the normal operation target torque TRQNRTG; and the number of engine revolutions NE is equal to the normal operation target number of revolutions NENRTG. In step S70, the ECU 5 sets the engine direct drive inhibition flag FENGDDINH at "1."

Figure 9A:
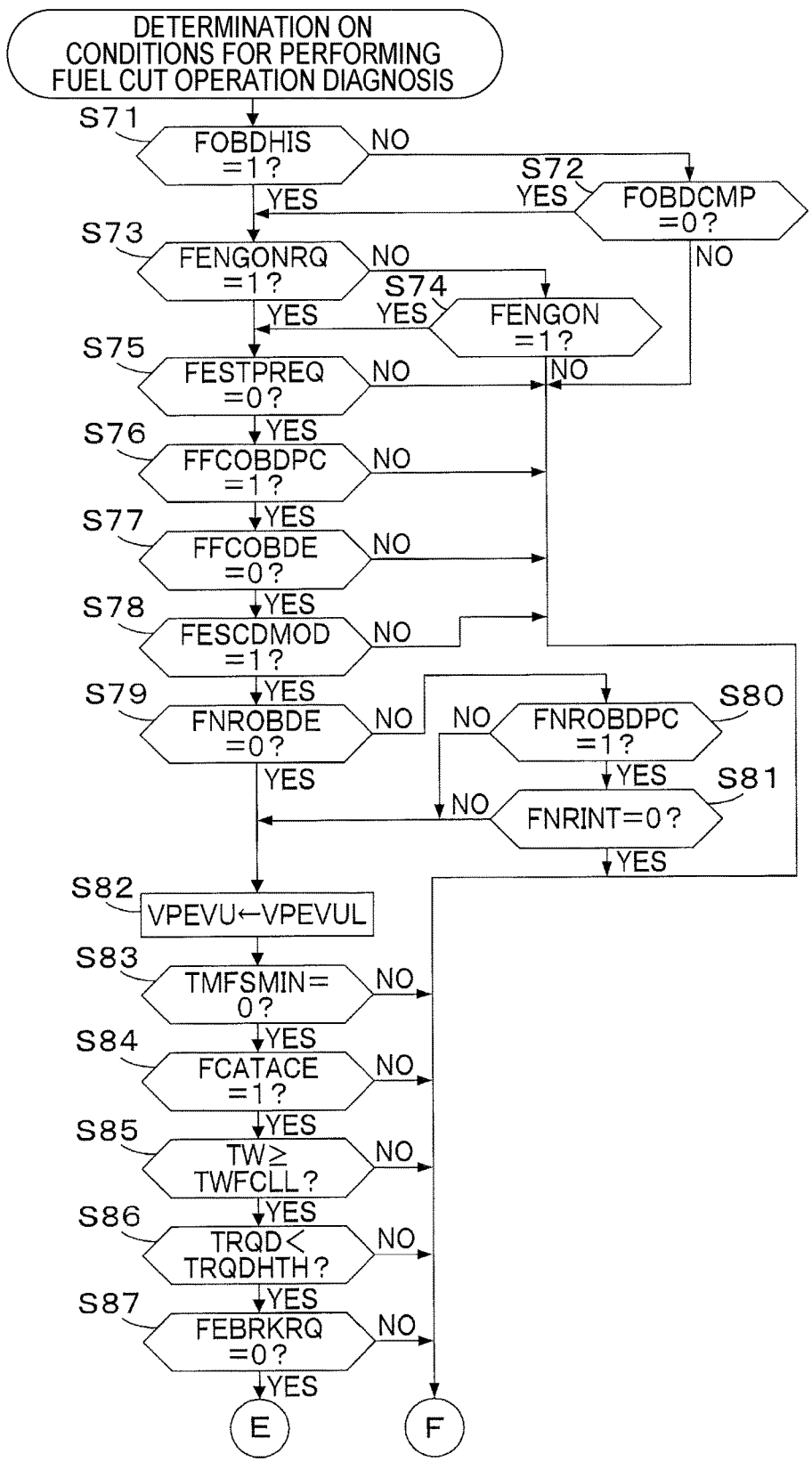
FIGS. 9A and 9B are flowcharts of a process of determining conditions for performing a fuel cut operation diagnosis.
Figure 9B:
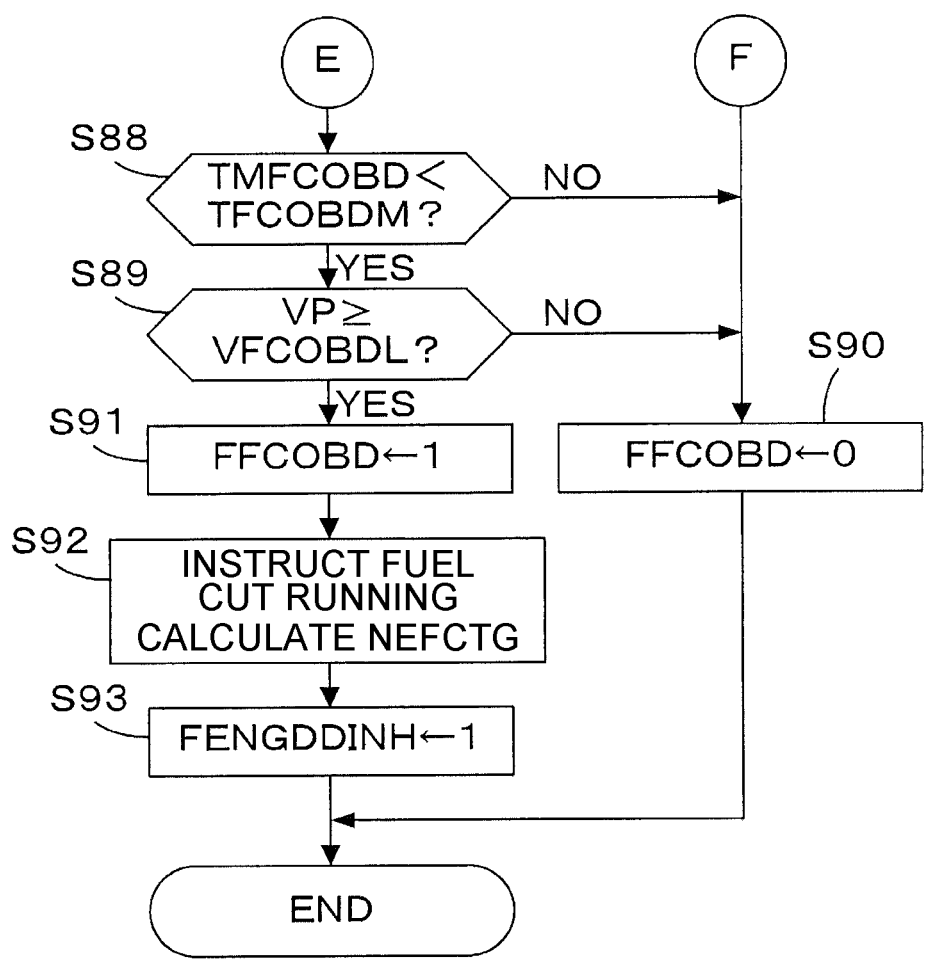

FIGS. 9A and 9B are flowcharts of a process of determining whether the conditions for performing the fuel cut operation diagnosis are satisfied. The ECU 5 performs this process at constant time intervals.

Steps S71 to S75 are the same as steps S11 to S15 in FIG. 6A, and determine whether the same conditions as in steps S11 to S15 are satisfied. In the answer in step S72, S74 or S75 is negative (NO), the ECU 5 determines that the corresponding condition for performing the fuel cut operation diagnosis is not satisfied, and proceeds to step S90, where the ECU 5 sets the fuel cut operation diagnosis execution flag FFCOBD at "0."

If the answer in step S75 is positive (YES), the ECU 5 proceeds to step S76. In steps S76, S77 and S78, the ECU 5 sequentially makes the following determinations. If a determination result in one of steps S76, S77 and S78 is positive (YES), the ECU 5 proceeds to the next step. If the determination result in one of steps S76, S77 and S78 is negative (NO), the ECU 5 determines that the corresponding condition for performing the fuel cut operation diagnosis is not satisfied, and proceeds to step S90.

In step S76, the ECU 5 determines whether a fuel cut operation diagnosis precondition FFCOBDPC is at "1." The fuel cut operation diagnosis precondition FFCOBDPC is set at "1" when a precondition used to allow the fuel cut operation diagnosis to be performed, and not determined in this process (for example, a condition that the sensors used for the failure diagnoses are determined as being normal) is satisfied.

In step S77, the ECU 5 determines whether a fuel cut operation diagnosis end flag FFCOBDE is at "1." The fuel cut operation diagnosis end flag FFCOBDE is set at "1" when all the failure diagnoses to be performed for the fuel cut operation diagnosis are completed.

In step S78, the ECU 5 makes the same determination as in step S18 in FIG. 6A.

If the answer in step S78 is positive (YES), the ECU 5 determines whether the normal operation diagnosis end flag FNROBDE is at "1" (in step S79). If the answer in step S79 is negative (NO) and the normal operation diagnosis is not completed, the ECU 5 determines whether the normal operation diagnosis precondition flag FNROBDPC is at "1" (in step S80). If the answer in step S80 is positive (YES), the ECU 5 determines whether the stop condition flag FNRINT is at "0" (in step S81). If the answer in step S80 or S81 is negative (NO), that is to say, if the precondition for the normal operation diagnosis is not satisfied, or if the condition for stopping the normal operation diagnosis is satisfied, the ECU 5 proceeds to step S82. If the answer in step S81 is positive (YES), the ECU 5 proceeds to step S90.

If the normal operation diagnosis precondition flag FNROBDPC is at "1" in step S80 via step S79, the ECU 5 performs the fuel cut operation diagnosis after completing the normal operation diagnosis. Furthermore, if the stop condition is satisfied in the process illustrated in FIG. 7, the ECU 5 performs the fuel cut operation diagnosis when the conditions for performing the fuel cut operation diagnosis are satisfied in steps S79 and S81.

In step S82, the ECU 5 sets the motor drive upper limit vehicle speed VPEVU at the predetermined low vehicle speed VPEVUL.

In the subsequent steps S83 to S89, the ECU 5 sequentially makes the following determinations. If a determination result in one of steps S83 to S89 is positive (YES), the ECU 5 proceeds to the next step. If the determination result in one of steps S83 to S89 is negative (NO), the ECU 5 determines that the corresponding condition for performing the fuel cut operation diagnosis is not satisfied, and proceeds to step S90.

In step S83, the ECU 5 determines whether the value of the minimum fuel supply operation time timer TMFSMIN is at "0."

In step S84, the ECU 5 makes the same determination as in step S57 in FIG. 7.

In step S85, the ECU 5 determines whether the cooling water temperature TW is not less than a fuel cut operation diagnosis execution lower limit temperature TWFCLL. The fuel cut operation diagnosis execution lower limit temperature TWFCLL is set at a temperature which is equal to or lower than the warm-up end temperature TWWUE.

In step S86, the ECU 5 makes the same determination as in step S24 in FIG. 6B.

In step S87, the ECU 5 makes the same determination as in step S25 in FIG. 6B.

In step S88, the ECU 5 determines whether the value of a fuel cut operation diagnosis execution timer TMFCOBD is less than a maximum fuel cut operation diagnosis time TFCOBDM (for example, 15 seconds). The fuel cut operation diagnosis execution timer TMFCOBD is an up-count timer which measures the execution time of the fuel cut operation diagnosis. The fuel cut operation diagnosis execution timer TMFCOBD is reset when the fuel cut operation diagnosis is interrupted, when the fuel cut operation diagnosis is completed, or when the fuel cut operation diagnosis is stopped because the timer value reaches the maximum fuel cut operation diagnosis time TFCOBDM.

In step S89, the ECU 5 determines whether the vehicle speed VP is not less than a fuel cut operation diagnosis lower limit vehicle speed VFCOBDL (for example, 50 km/h). In this embodiment, the fuel cut operation diagnosis lower limit vehicle speed VFCOBDL is set at a speed which is equal to the predetermined low vehicle speed VPEVUL of the motor drive upper limit vehicle speed VPEVU.

If the answer in step S89 is positive (YES), the ECU 5 determines that the corresponding condition for performing the fuel cut operation diagnosis is satisfied, and sets the fuel cut operation diagnosis execution flag FFCOBD at "1" (in step S91). In step S92, the ECU 5 instructs the fuel cut operation of the engine 1, and calculates a fuel cut operation target number of revolutions NEFCTG. The fuel cut operation target number of revolutions NEFCTG means the number of engine revolutions to be achieved by the generator 62 which drives the engine 1.

In step S93, the ECU 5 sets the engine direct drive inhibition flag FENGDDINH at "1."

Next, referring to time charts shown in FIGS. 10 to 14, descriptions will be provided for operation examples of how the above-discussed failure diagnoses are performed.

Figure 10:
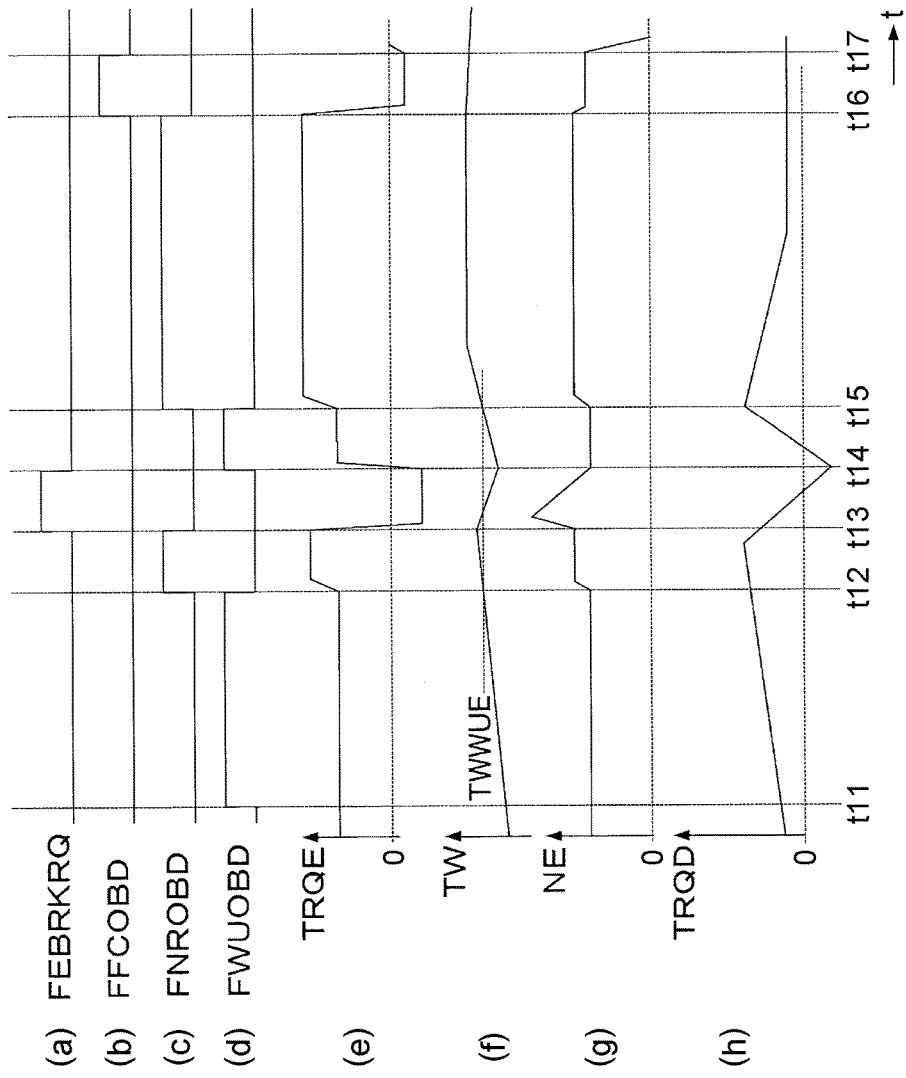
FIG. 10 is a time chart for explaining an example of a first operation in which the normal operation diagnosis is interrupted while the normal operation diagnosis is being performed.

FIG. 10 is a time chart for explaining an operation example in which, while the normal operation diagnosis is being performed, the normal operation diagnosis is interrupted because the engine brake request flag FEBRKRQ is set at "1" to perform the engine brake operation. These diagrams show how the engine brake request flag FEBRKRQ, the fuel cut operation diagnosis execution flag FFCOBD, the normal operation diagnosis execution flag FNROBD, the warming up diagnosis execution flag FWUOBD, the engine output torque TRQE, the cooling water temperature TW, the number of engine revolutions NE, and the requested vehicle drive torque TRQD change.

In this example, the operation of the engine 1 is already started, and at time t11, the warming up diagnosis is started. At time t12, the cooling water temperature TW reaches the warm-up end temperature TWWUE, and the normal operation diagnosis is started. At time t13, the engine brake request flag FEBRKRQ is set at "1," the engine brake operation is performed, and the normal operation diagnosis is interrupted. During the engine brake operation, the supply of fuel to the engine 1 is stopped, and the engine 1 is driven at relatively high rotation by: making the motor 61 work as a generator; and making the generator 62 work as a motor. Thereby, electric power generated by the motor 61 is consumed by the generator 62. Thus, a braking effect is exerted.

At time t14, the engine brake operation is terminated. The cooling water temperature TW is lower than the warm-up end temperature TWWUE. For this reason, the warming up diagnosis flag FWUOBD is set at "1," and warming up is started. At time t15, the cooling water temperature TW again reaches the warm-up end temperature TWWUE, and the normal operation diagnosis is resumed.

At time t16, the normal operation diagnosis is completed, and the fuel cut operation diagnosis is started. At time t17, the fuel cut operation diagnosis is completed, and the operation of the engine 1 is terminated.

Figure 11:
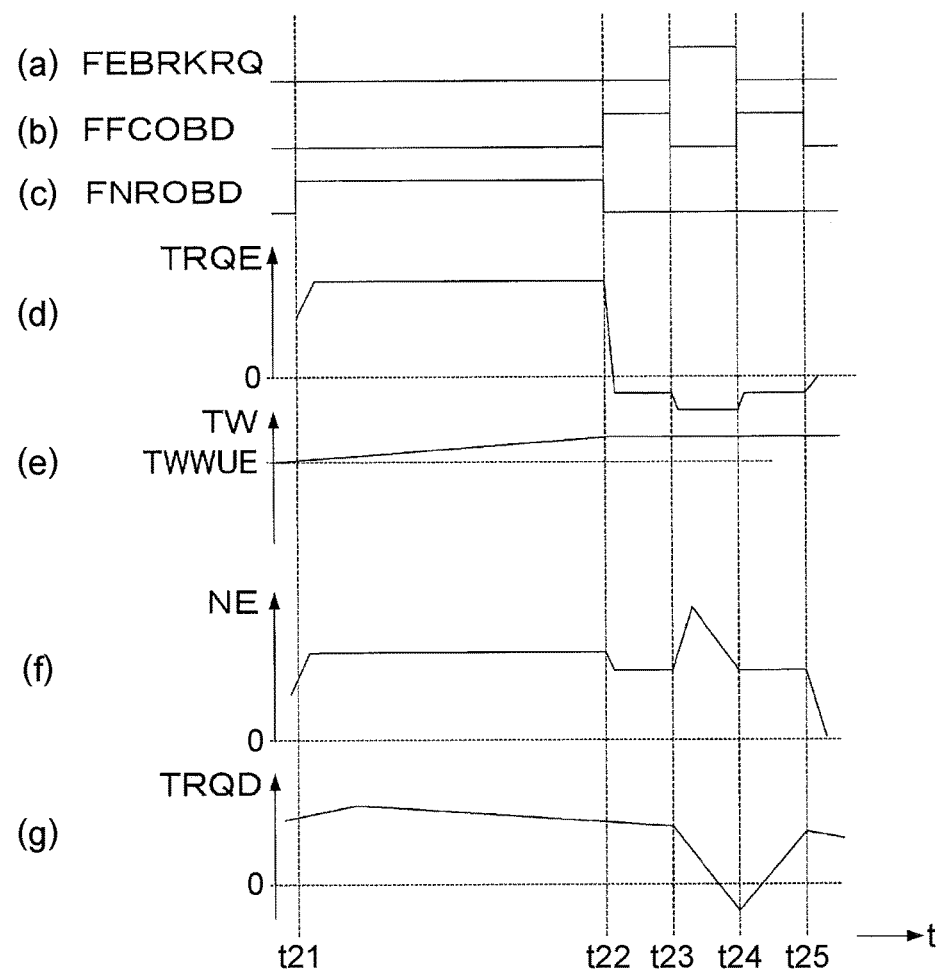
FIG. 11 is a time chart for explaining an example of a first operation in which the fuel cut operation diagnosis is interrupted while the fuel cut operation diagnosis is being performed.

FIG. 11 is a time chart for explaining an operation example in which, while the fuel cut operation diagnosis is being performed, the fuel cut operation diagnosis is interrupted because the engine brake operation is performed. These diagrams show how the engine brake request flag FEBRKRQ, the fuel cut operation diagnosis execution flag FFCOBD, the normal operation diagnosis execution flag FNROBD, the engine output torque TRQE, the cooling water temperature TW, the number of engine revolutions NE and the requested vehicle drive torque TRQD change.

In the period from time t21 to time t22, the normal operation diagnosis is performed. At time t22, the fuel cut operation diagnosis is started. At time t23, the engine brake request flag FEBRKRQ is set at "1," the engine brake operation is performed, and the fuel cut operation diagnosis is interrupted. At time t24, the cooling water temperature TW remains high. For this reason, once the engine brake operation is completed, the fuel cut operation diagnosis is resumed. At time t25, the fuel cut operation diagnosis is completed, and the operation of the engine 1 is terminated.

Figure 12:
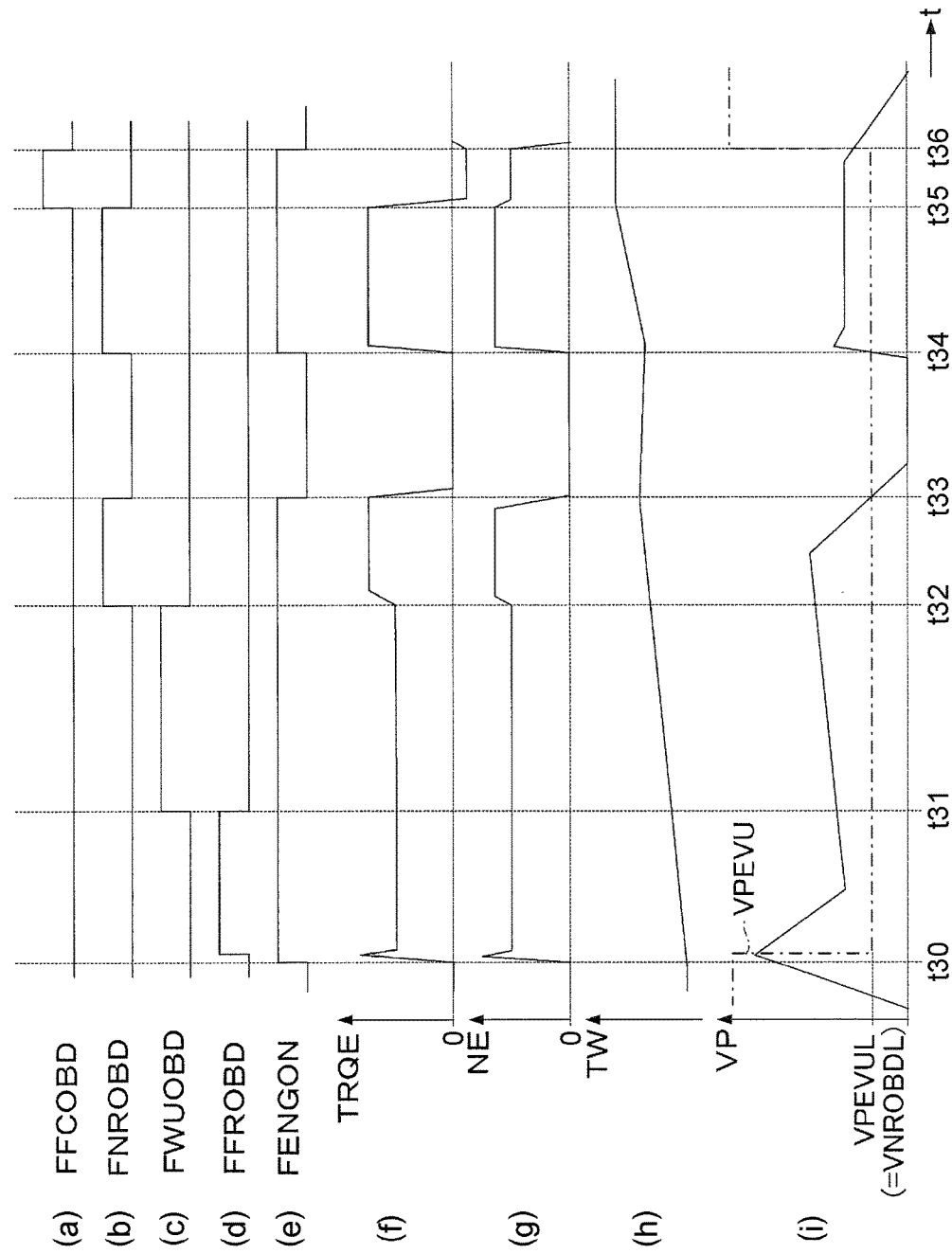
FIG. 12 is a time chart for explaining an example of a second operation in which the normal operation diagnosis is interrupted while the normal operation diagnosis is being performed.

FIG. 12 is a time chart for explaining an operation example in which, while the normal operation diagnosis is being performed, the normal operation diagnosis is interrupted because the vehicle speed VP decreases (in FIG. 8, the answer in step S62 is negative). These diagrams show how the fuel cut operation diagnosis execution flag FTCOBD, the normal operation diagnosis execution flag FNROBD, the warming up diagnosis execution flag FWUOBD, the catalyst temperature rise acceleration operation diagnosis execution flag FFROBD, the engine on flag FENGON, the engine output torque TRQE, the cooling water temperature TW, the number of engine revolutions NE and the vehicle speed VP change. The chain line drawn in FIG. 12 shows how the motor drive upper limit vehicle speed VPEVU changes.

At time t30, one of the predetermined conditions for starting the operation of the engine is satisfied, and the operation of the engine 1 is started. Immediately after that, the catalyst temperature rise acceleration operation diagnosis is started, and the motor drive upper limit vehicle speed VPEVU is changed to the predetermined low vehicle speed VPEVUL (=the normal operation diagnosis lower limit vehicle speed VNROBDL). The motor drive upper limit vehicle speed VPEVU is kept at the predetermined low vehicle speed VPEVUL until the needed failure diagnoses are completed.

At time t31, the warming up diagnosis is started. At time t32, the normal operation diagnosis is started. At time t33, the vehicle speed VP is lower than the normal operation diagnosis lower limit vehicle speed VNROBDL. Thus, the operation of the engine 1 is terminated, and the normal operation diagnosis is interrupted.

At time t34, the vehicle speed VP is higher than the motor drive upper limit vehicle speed VPEVU (=the normal operation diagnosis lower limit vehicle speed VNROBDL). For this reason, the operation of the engine 1 is started, and the normal operation diagnosis is resumed. At time t35, the normal operation diagnosis is completed, and the fuel cut operation diagnosis is started. At time t36, the fuel cut operation diagnosis is completed. Thus, the motor drive upper limit vehicle speed VPEVU is changed to the predetermined high vehicle speed VPEVUH, and the operation of the engine 1 is terminated.

Figure 13:
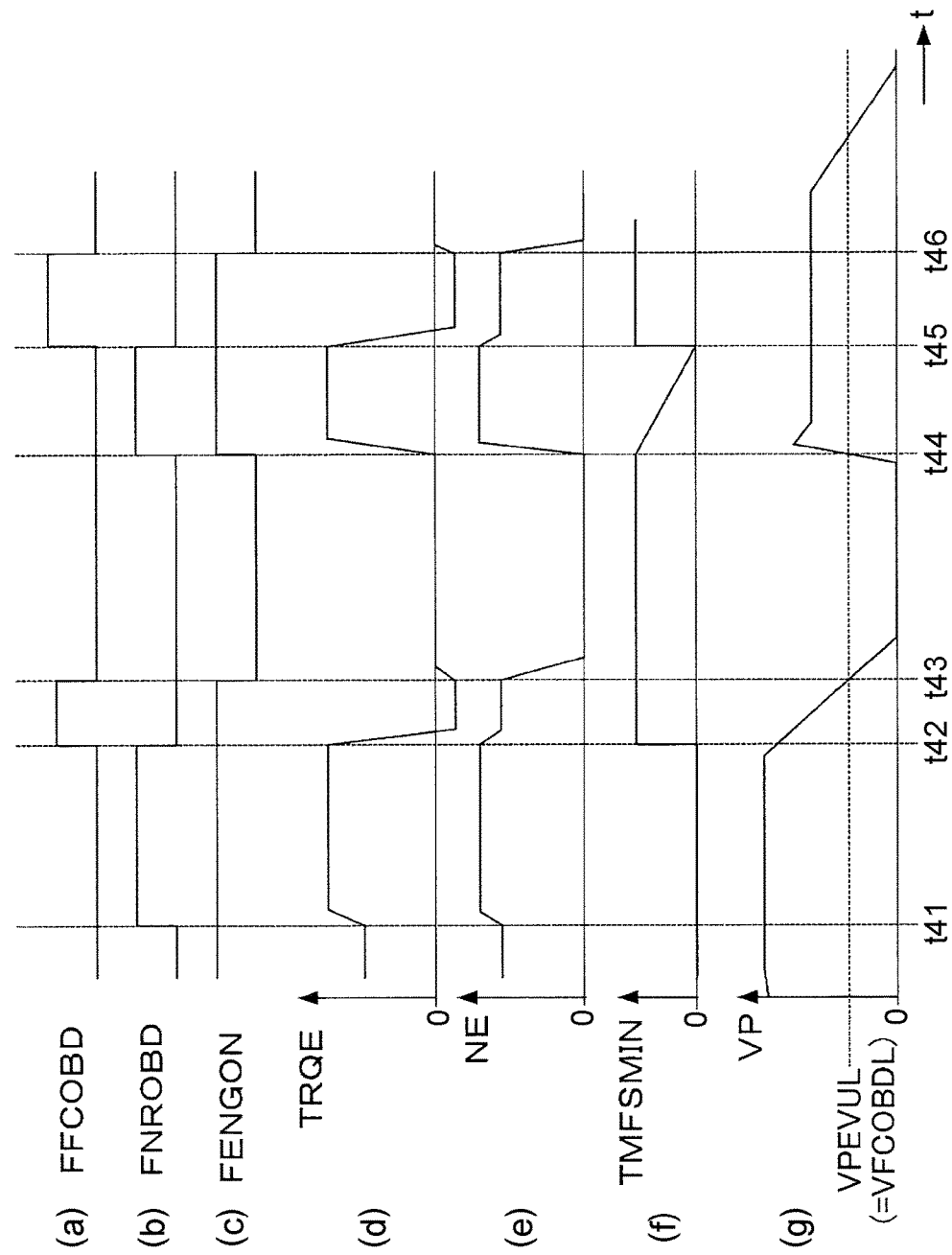
FIG. 13 is a time chart for explaining an example of a second operation in which the fuel cut operation diagnosis is interrupted while the fuel cut operation diagnosis is being performed.

FIG. 13 is a time chart for explaining an operation example in which, while the fuel cut operation diagnosis is being performed, the fuel cut operation diagnosis is interrupted because the vehicle speed VP decreases (in FIG. 9B, the answer in step S89 is negative). These diagrams show how the fuel cut operation diagnosis execution flag FFCOBD, the normal operation diagnosis execution flag FNROBD, the engine on flag FENGON, the engine output torque TRQE, the number of engine revolutions NE, the value of the minimum fuel supply operation time timer TMFSMIN and the vehicle speed VP change.

The warm-up of the engine 1 is completed by time t41. The value of the minimum fuel supply operation time timer TMFSMIN is at "0." At time t41, the normal operation diagnosis is started. At time t42, the normal operation diagnosis is switched to the fuel cut operation diagnosis. At this time, the value of the minimum fuel supply operation time timer TMFSMIN is set at the minimum fuel supply operation time TFSMIN. At time t43, the vehicle speed VP is lower than the predetermined low vehicle speed VPEVUL (=the fuel cut operation diagnosis lower limit vehicle speed VFCOBDL) of the motor drive upper limit vehicle speed VPEVU. Thus, the operation of the engine 1 is stopped, and the fuel cut operation diagnosis is interrupted.

At time t44, the vehicle speed VP is higher than the motor drive upper limit vehicle speed VPEVU (=VFCOBDL). Thus, the operation of the engine 1 is started, and the minimum fuel supply operation time timer TMFSMIN starts the countdown. Until the value of the minimum fuel supply operation time timer TMFSMIN reaches "0," the corresponding condition for performing the fuel cut operation diagnosis remains unsatisfied (in step S83 in FIG. 9A). Until that, therefore, the engine is operating while supplied with fuel, and the normal operation diagnosis is accordingly performed (in steps S48 and S49 in FIG. 7).

At time t45, the value of the minimum fuel supply operation time timer TMFSMIN reaches "0," and the corresponding condition for performing the fuel cut operation diagnosis is satisfied. Thus, the fuel cut operation diagnosis is resumed. At time t46, the fuel cut operation diagnosis is completed, and the operation of the engine 1 is terminated.

Figure 14:
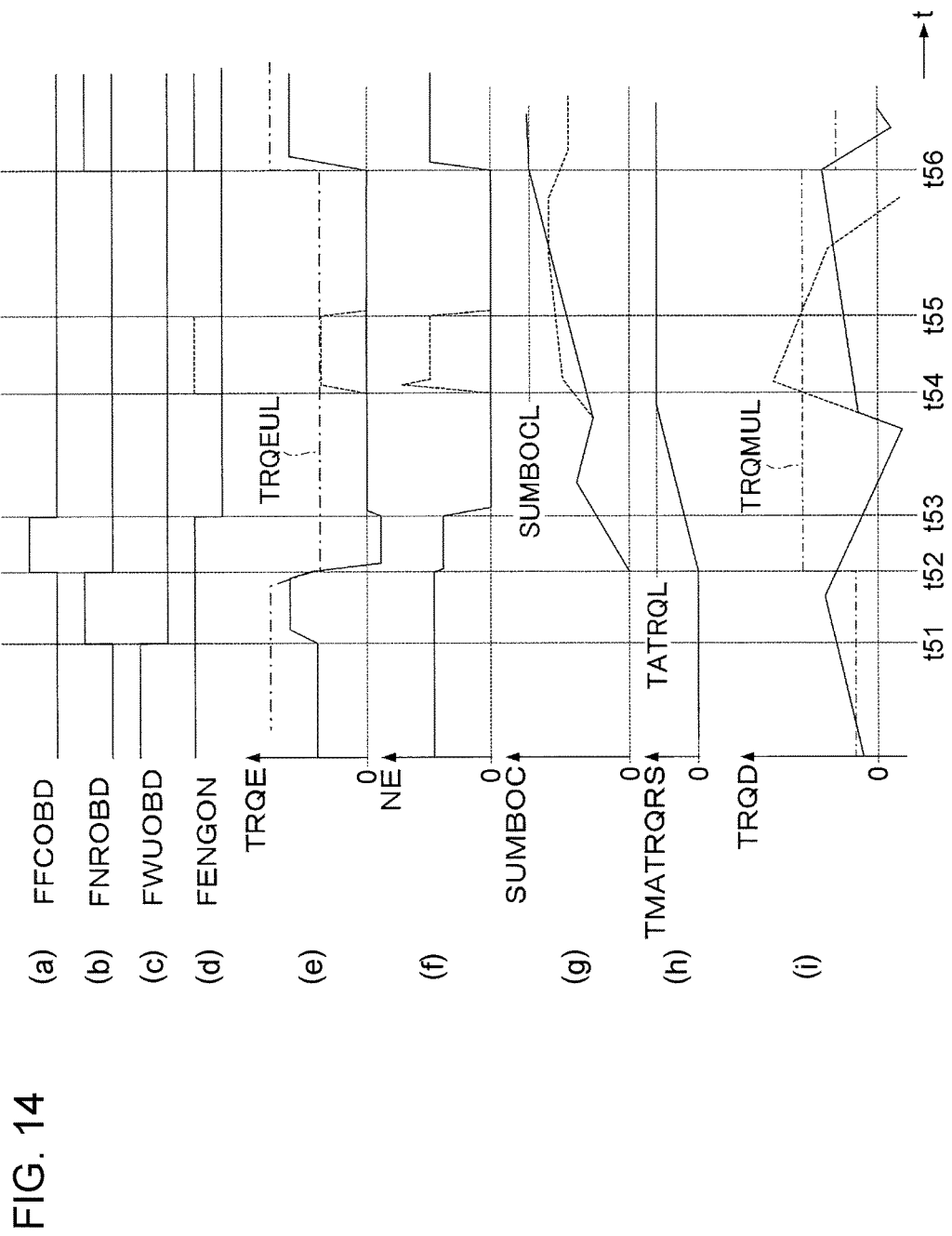
FIG. 14 is a time chart for explaining an example of a third operation in which the normal operation diagnosis is interrupted while the normal operation diagnosis is being performed.

FIG. 14 is a time chart for explaining an operation example in which, while the normal operation diagnosis is being performed, the normal operation diagnosis is stopped because the chargeable power PBRL of the high-voltage battery 66 decreases and the upper limit engine output torque TRQEUL is changed downward. These diagrams show how the fuel cut operation diagnosis execution flag FFCOBD, the normal operation diagnosis execution flag FNROBD, the warming up diagnosis execution flag FWUOBD, the engine on flag FENGON, the engine output torque TRQE, the number of engine revolutions NE, the battery output current integrated value SUMBOC, the value of the post-torque-restraint timer TMATRQRS and the requested vehicle drive torque TRQD change.

Until time t51, the warming up diagnosis is performed. At time t51, the normal operation diagnosis is started. At time t52, the upper limit engine output torque TRQEUL is lower than the engine output torque TRQE (the normal operation target torque TRQNRTG). Thus, the corresponding stop condition is satisfied (in steps S56 to S58 in FIG. 7), and the normal operation diagnosis is stopped. The fuel cut operation diagnosis is started (in step S81 in FIG. 9A). At time t52, an integrating operation of the battery output current integrated value SUMBOC and up-counting of the post-torque-restraint timer TMATRQRS are started.

At time t53, the fuel cut operation diagnosis is completed, and the operation of the engine 1 is terminated. In an example indicated with the dashed lines in (g) to (i) of FIG. 14, at time t54, the requested vehicle drive torque TRQD exceeds the motor drive upper limit torque TRQMUL, and the operation of the engine 1 is started. At this time, the value of the post-torque-restraint timer TMATRQRS reaches the resumption permission time TATRQL. However, the battery output current integrated value SUMBOC does not reach the resumption permission current threshold SUMBOCL (in steps S65 and S66 in FIG. 8). Thus, the corresponding condition for performing the normal operation diagnosis is not satisfied. For this reason, the engine 1 is operated only in a period when the requested vehicle drive torque TRQD is greater than the motor drive upper limit torque TRQMUL, that is to say, in a period from time t54 to time t55.

In the example indicated with the solid lines, at time t56, the battery output current integrated value SUMBOC reaches the resumption permission current threshold SUMBOCL. At this time, the motor drive upper limit torque TRQMUL is changed at a smaller value, and the requested vehicle drive torque TRQD exceeds the motor drive upper limit torque TRQMUL. Thus, the operation of the engine 1 is started. Thereby, the corresponding condition for performing the normal operation diagnosis is satisfied, and the interrupted normal operation diagnosis is resumed. The reason why the motor drive upper limit torque TRQMUL is changed at a smaller value is that the condition (1) for staring the operation of the engine is made easier to satisfy.

Incidentally, a decrease in the battery output current integrated value SUMBOC in FIG. 14 results from the charging of the high-voltage battery 66.

As discussed above, in the case where, while in the CD mode operation, the operation of the engine 1 is started because one of the predetermined condition for starting the operation of the engine is satisfied, the embodiment carries out the failure diagnosis operation for continuing the operation of the engine 1 to perform the failure diagnoses even after the condition for starting the operation of the engine becomes unsatisfied. For this reason, a vehicle in which a proportion of the CD-mode operation time is large can securely perform the failure diagnoses to be performed while the engine is operating.

Furthermore, the situation in which no failure diagnosis operation is performed and the failure diagnoses are not completed occurs, for example, in a case where in the previous driving period, the engine 1 is hardly operated and none of the conditions for performing the failure diagnoses are satisfied. The failure diagnosis operation to be performed in the current driving period is effective for such a case. Meanwhile, there is a case, for example, where in the previous driving period, no failure diagnosis operation is performed but the failure diagnoses are completed. One may consider that the reason for this case is that the driving pattern of the user of the vehicle tends to use the CS mode in which the operation of the engine is performed for the purpose of sustaining the state of charge in the high-voltage battery 66. Accordingly, one may determine that the necessity of performing the failure diagnosis operation purposefully is small. For this reason, the conditions for performing the failure diagnosis operation include the condition that in the previous driving period of the vehicle 100, no failure diagnosis operation is performed and the failure diagnoses are not completed. This makes it possible to exclude in advance the case which is least likely to require the failure diagnosis operation.

In addition, for example, in the case where the vehicle user charges the high-voltage battery 66 at night and repeats short-distance drives in the daytime, the failure diagnosis operation is highly likely to be needed. For this reason, the conditions for performing the failure diagnosis operation include the condition that a failure diagnosis operation is performed in the previous driving period. This makes it possible to securely determine the case which is highly likely to require the failure diagnosis operation.

Furthermore, when the requested vehicle drive torque TRQD is equal to or greater than the high output request threshold TRQDHTH, the engine output torque TRQE needs to be increased. Meanwhile, when the engine brake operation is required, the engine 1 needs to be driven with torque larger than in the fuel cut operation by using the electric power generated by the motor 61. In these cases, it is impossible to establish the engine operating state which enables the failure diagnoses. For this reason, the conditions for performing the failure diagnosis engine operation include: the condition that the requested vehicle drive torque TRQD is less than the high output request threshold TRQDHTH; and the condition that no engine brake operation is requested. This makes it possible to appropriately determine the vehicle driving state which enables the failure diagnoses.

Moreover, performed are the warming up diagnosis to be performed while the engine 1 is warming up; the normal operation diagnosis to be performed after the completion of the warm-up of the engine 1 with the engine output torque TRQE set larger than the output torque during the warming-up; and the fuel cut operation diagnosis to be performed while the fuel cut operation is being performed after the completion of the warm-up of the engine 1. For this reason, it is possible to securely perform the failure diagnoses needed to be performed during each operation state.

Besides, although the high-voltage battery 66 is charged while the operation of the engine 1 is being performed, the high-voltage battery 66 cannot be further charged in the case where the SOC in the high-voltage battery 66 is high (the chargeable power PBRL is low). Thus, it is impossible to establish the engine operating state needed for the failure diagnoses. For this reason, the conditions for performing the failure diagnoses include the conditions that the SOCs in the high-voltage battery 66 are respectively equal to or less than the warming up execution upper limit value SOCWUUL and the normal operation execution upper limit value SOCNRUL which are set corresponding to the warming up diagnosis and the normal operation diagnosis. This makes it possible to appropriately perform the failure diagnoses.

In addition, in the case where the operation of the engine 1 is being performed while the vehicle speed VP is low, there is likelihood that the vehicle user feels engine operation noises which is caused by the engine operation, and have uncomfortable feeling. For this reason, the conditions for performing the failure diagnoses include the conditions that the vehicle speeds VP are respectively equal to or greater than the normal operation diagnosis lower limit vehicle speed VNROBDL and the fuel cut operation diagnosis lower limit vehicle speed VFCOBDL which are set corresponding to the normal operation diagnosis and the fuel cut operation diagnosis. This makes it possible to avoid the uncomfortable feeling being given to the user.

Furthermore, failure diagnoses for the fuel cut operation diagnosis can be accurate in a case where they are performed after the fuel supply operation in which fuel is combusted by being supplied to the engine 1 is performed in some length of time. For this reason, the conditions for performing the fuel cut operation diagnosis include the condition that the length time for which the fuel cut operation is performed is equal to or greater than the minimum fuel supply operation time TFSMIN. This makes it possible to secure determination accuracy for the fuel cut operation diagnosis.

Moreover, when the SOC in the high-voltage battery 66 is large, the high-voltage battery 66 needs to be restrained from being further charged, that is to say, the engine output torque TRQE needs to be limited for the purpose of satisfying the request for stopping the charge. For this reason, the upper limit engine output torque TRQEUL is set depending on the SOC in the high-voltage battery 66. If the stop condition that the upper limit engine output torque TRQEUL becomes less than the normal operation target torque TRQNRTG is satisfied while the normal operation diagnosis is being performed, the normal operation diagnosis is interrupted. Thereby, the request for stopping the charge can be satisfied.

Besides, in the case where, while the normal operation diagnosis is being performed, the normal operation diagnosis is interrupted because the stop condition is satisfied, if one of the conditions for performing the fuel cut operation diagnosis is satisfied, the fuel cut operation diagnosis is performed. During the fuel cut operation, no engine output torque occurs, and the high-voltage battery 66 is not charged. Thus, even in the case where the condition for stopping the normal operation diagnosis is satisfied, the fuel cut operation diagnosis can be performed. For this reason, when the condition for stopping the normal operation diagnosis is satisfied, the fuel cut operation diagnosis is performed. This makes it possible to complete the fuel cut operation diagnosis earlier.

In addition, when the stop condition is satisfied while the normal operation diagnosis is being performed, the SOC in the high-voltage battery 66 is high. For this reason, the conditions for performing the normal operation diagnosis include the condition that: the time length which has passed since the stop condition is satisfied reaches the predetermined resumption permission time TATRQL; and the battery output current integrated value SUMBOC reaches the predetermined resumption permission current threshold SUMBOCL. This makes it possible to securely avoid the repetition of the interruption and resumption of the normal operation diagnosis for a short time.

Furthermore, if there is likelihood that any one of the conditions for performing the normal operation diagnosis or any one of the conditions for performing the fuel cut operation diagnosis is satisfied, the motor drive upper limit vehicle speed VPEVU is changed from the predetermined high vehicle speed VPEVUH to the predetermined low vehicle speed VPEVUL. Thus, the vehicle speed VP decreases, and the condition for performing the normal operation diagnosis or the fuel cut operation diagnosis becomes unsatisfied. Thereafter, when the vehicle speed VP increases, the operation of the engine 1 can be easily started. This makes it possible to resume the normal operation diagnosis or the fuel cut operation diagnosis earlier.

In the embodiment, the ECU 5 works as the drive controller (drive control circuitry and drive control means), the failure diagnoser (failure diagnosis circuitry and failure diagnosis means), the upper limit engine output torque setter (upper limit engine output torque setting circuitry), the output current integrated value calculator (output current integrated value calculating circuitry), and the electric motor drive upper limit vehicle speed reducer (electric motor drive upper limit vehicle speed reducing circuitry). In the embodiment, the internal combustion engine 1, the intake air temperature sensor 13, the cooling water temperature sensor 14, the proportional oxygen concentration sensor 17, and the binary oxygen concentration sensor 18 are included in an internal combustion engine system.

It should be noted that: the present disclosure is not limited to the above-discussed embodiment; and the embodiment can be variously modified. In the above-discussed embodiment, once the operation of the engine 1 is started, the motor drive upper limit vehicle speed VPEVU is changed to the predetermined low vehicle speed VPEVUL (see FIG. 12) until the normal operation diagnosis and the fuel cut operation diagnosis are completed. Thereby, when the diagnoses are interrupted, they can be resumed earlier. Instead of the motor drive upper limit vehicle speed VPEVU, however, the motor drive upper limit torque TRQMUL may be changed in a period from a time of the start of the operation of the engine 1 to a time of the completion of the normal operation diagnosis and the fuel cut operation diagnosis. This case may be achieved by: setting the motor drive upper limit torque TRQMUL at a predetermined high torque TRQMULH before the operation of the engine 1 is started; and changing the motor drive upper limit torque TRQMUL to a predetermined low torque TRQMUL (<TRQMULH) in the period from the time of the start of the operation of the engine 1 to the time of the completion of the normal operation diagnosis and the fuel cut operation diagnosis. Otherwise, both the motor drive upper limit vehicle speed VPEVE and the motor drive upper limit torque TRQMUL may be changed in the same way as discussed above.

A first aspect of the present disclosure describes a controller for vehicle which includes an internal combustion engine and an electric motor as a vehicle driving source, and a battery capable of supplying electric power to the electric motor, and is capable of charging the battery by operating the engine, and by using an external power supply, the controller including, a drive controller which controls drives of the engine and the electric motor; and a failure diagnoser which performs a failure diagnosis of at least one of the engine and its accessory devices inclusive of a sensor mounted on the engine while the engine is in operation, in which the drive controller is capable of performing a charge depleting mode operation in which the engine is not operated and the electric motor is mainly used as the vehicle driving source to sustain a state of charge (SOC) in the battery, and in a case where during the charge depleting mode operation, the engine is activated because a predetermined condition for starting operation of the engine is satisfied, the drive controller carries out a failure diagnosis engine operation to continue the operation of the engine to perform the failure diagnosis even after the condition for starting the operation of the engine becomes unsatisfied.

In the case where, while the charge depleting mode operation is being performed, the engine is activated because the predetermined condition for starting the operation of the engine is satisfied, this configuration performs the failure diagnosis engine operation to continue the operation of the engine for the purpose of performing the failure diagnosis even after the condition for starting the operation of the engine becomes unsatisfied. Thus, a vehicle in which a proportion of the charge depleting mode operation time is large can securely perform the failure diagnosis to be performed while the engine is operating.

In the controller for vehicle according to the first aspect, a second aspect of the present disclosure describes a controller for vehicle in which the condition for performing the failure diagnosis engine operation includes a condition that: no failure diagnosis engine operation is performed during a previous one driving period of the vehicle which is defined as being from the start to end of the drive of the vehicle; and the failure diagnosis is not completed.

The situation in which no failure diagnosis engine operation is performed and the failure diagnosis is not completed occurs, for example, in a case where in the previous driving period, the engine is hardly operated and the condition for performing the failure diagnosis is not satisfied. The failure diagnosis engine operation to be performed in the current driving period is effective for such a case. Meanwhile, there is a case, for example, where in the previous driving period, no failure diagnosis engine operation is performed but the failure diagnosis is completed. One may consider that the reason for this case is that the driving pattern of the user of the vehicle tends to use the charge sustaining mode in which the operation of the engine is performed for the purpose of sustaining the state of charge in the battery. Accordingly, one may determine that the necessity of further performing the failure diagnosis operation is small. For this reason, the condition for performing the failure diagnosis engine operation includes the condition that in the previous driving period of the vehicle, no failure diagnosis engine operation is performed and the failure diagnosis is not completed. This makes it possible to exclude in advance the case which is least likely to require the failure diagnosis operation.

In the controller for vehicle according to the second aspect, a third aspect of the present disclosure describes a controller for vehicle in which the condition for performing the failure diagnosis engine operation includes a condition that the failure diagnosis engine operation is performed during the previous driving period of the vehicle.

For example, in the case where the vehicle user charges the battery at night and repeats short-distance drives in the daytime, the failure diagnosis operation is highly likely to be needed. For this reason, the condition for performing the failure diagnosis operation includes the condition that the failure diagnosis engine operation is performed in the previous driving period. This makes it possible to securely determine the case which is highly likely to require the failure diagnosis operation.

In the controller for vehicle according to any one of the first to third aspects, a fourth aspect of the present disclosure describes a controller for vehicle in which the condition for performing the failure diagnosis engine operation includes a condition that a requested drive toque (TRQD) is less than a predetermined high output threshold (TRQDHTH), and a condition that no engine brake operation is requested (FEBRKRQ=0), and, the engine brake operation is an operation in which supply of fuel to the engine is stopped during deceleration of the vehicle, and the electric motor is operated as a power generator, and the engine is driven using electric power thus generated.

When the requested drive torque of the vehicle is equal to or greater than the predetermined high output threshold, the engine output torque needs to be increased. Meanwhile, when the engine brake operation is required, the engine needs to be driven with the relatively large torque by using the electric power generated by the electric motor. In these cases, it is impossible to establish the engine operating state which enables the failure diagnosis. For this reason, the condition for performing the failure diagnosis engine operation includes: the condition that the requested drive torque is less than the predetermined high output threshold; and the condition that no engine brake operation is requested. This makes it possible to appropriately determine the vehicle driving state which enables the failure diagnosis.

In the controller for vehicle according to any one of the first to fourth aspects, a fifth aspect of the present disclosure describes a controller for vehicle in which the failure diagnosis includes a warming up diagnosis to be performed while the engine is warming up, a normal operation diagnosis to be performed after completion of warm-up of the engine with an output torque (TRQE) of the engine set at a normal operation target torque (TRQNRTG) which is larger than an output torque during the warming-up, and a fuel cut operation diagnosis to be performed while a fuel cut operation which stops supply of fuel to the engine is being performed after the completion of the warm-up of the engine.

This configuration carries out: the warming up diagnosis to be performed while the engine is warming up; the normal operation diagnosis to be performed after the completion of the warm-up of the engine with the engine output torque set at the normal operation target torque which is greater than an output torque during the warming-up; and the fuel cut operation diagnosis to be performed while the fuel cut operation is being performed after the completion of the warm-up of the engine. For this reason, it is possible to securely perform the failure diagnosis needed to be performed during each operation state.

In the controller for vehicle according to the fifth aspect, a sixth aspect of the present disclosure describes a controller for vehicle in which the condition for performing the warming up diagnosis and the condition for performing the normal operation diagnosis, respectively, include conditions that the states of charge (SOC) in the battery are equal to or less than upper limit states of charge (SOCWUUL, SOCNRUL) which are set corresponding to the warming up diagnosis and the normal operation diagnosis.

Although the battery is charged while the operation of the engine is being performed, the battery cannot be further charged in the case where the state of charge in the battery is high. Thus, it is impossible to establish the engine operating state needed for the failure diagnosis. For this reason, the condition for performing the failure diagnosis includes the condition that the states of charge in the battery are respectively equal to or less than the upper limit states of charge which are set corresponding to the warming up diagnosis and the normal operation diagnosis. This makes it possible to appropriately perform the failure diagnosis.

In the controller for vehicle according to the fifth or sixth aspect, a seventh aspect of the present disclosure describes a controller for vehicle in which the condition for performing the normal operation diagnosis and the condition for performing the fuel cut operation diagnosis, respectively, include conditions that vehicle speeds (VP) of the vehicle are equal to or greater than lower limit speeds (VNROBDL, VFCOBDL) which are set corresponding to the normal operation diagnosis and the fuel cut operation diagnosis.

In a case where the operation of the engine is being performed while the vehicle speed is low, there is likelihood that the vehicle user feels engine operation noises which is caused by the engine operation, and have uncomfortable feeling. For this reason, the condition for performing the failure diagnosis includes the condition that the vehicle speeds are respectively equal to or greater than the lower limit speeds which are set corresponding to the normal operation diagnosis and the fuel cut operation diagnosis. This makes it possible to avoid the uncomfortable feeling being given to the user.

In the controller for vehicle according to any one of the fifth to seventh aspects, an eighth aspect of the present disclosure describes a controller for vehicle in which the condition for performing the fuel cut operation diagnosis includes a condition that a time length for which a fuel supply operation which supplies the fuel to the engine is performed is equal to or greater than a predetermined minimum fuel supply operation time (TFSMIN).

Some failure diagnoses included in the fuel cut operation diagnosis can be accurate in a case where they are performed after the fuel supply operation is performed in a certain time length. For this reason, the condition for performing the fuel cut operation diagnosis includes the condition that the length time for which the fuel cut operation is performed is equal to or greater than the minimum fuel supply operation time. This makes it possible to secure determination accuracy for the fuel cut operation diagnosis.

In the controller for vehicle according to any one of the fifth to eighth aspects, a ninth aspect of the present disclosure describes a controller for vehicle including an upper limit engine output torque setter which sets an upper limit engine output torque (TRQEUL) depending on the state of charge (SOC) in the battery, the upper limit engine output torque (TRQEUL) being an upper limit value of output torque (TRQE) of the engine, in which while the normal operation diagnosis is being performed, the normal operation diagnosis is stopped if a stop condition that the upper limit engine output torque (TRQEUL) becomes smaller than the normal operation target torque (TRQNRTG) is satisfied.

When the state of charge in the battery is high, the battery needs to be restrained from being further charged, that is to say, the engine output torque needs to be limited for the purpose of satisfying the request for stopping the charge. For this reason, the upper limit engine output torque is set depending on the state of charge in the battery. If the stop condition that the upper limit engine output torque becomes less than the normal operation target torque is satisfied while the normal operation diagnosis is being performed, the normal operation diagnosis is interrupted. Thereby, the request for stopping the charge can be satisfied.

In the controller for vehicle according to the ninth aspect, a tenth aspect of the present disclosure describes a controller for vehicle in which in a case where, while the normal operation diagnosis is being performed, the normal operation diagnosis is stopped because the stop condition is satisfied, the fuel cut operation diagnosis is performed if the condition for performing the fuel cut operation diagnosis is satisfied.

According to this configuration, the case where, while the normal operation diagnosis is being performed, the normal operation diagnosis is interrupted because the stop condition is satisfied, if the condition for performing the fuel cut operation diagnosis is satisfied, the fuel cut operation diagnosis is performed. During the fuel cut operation, no engine output torque occurs, and the battery is not charged. Thus, even in the case where the condition for interrupting the normal operation diagnosis is satisfied, the fuel cut operation diagnosis can be performed. For this reason, when the condition for interrupting the normal operation diagnosis is satisfied, the fuel cut operation diagnosis is performed. This makes it possible to complete the fuel cut operation diagnosis earlier.

In the controller for vehicle according to the tenth aspect, an eleventh aspect of the present disclosure describes a controller for vehicle including an output current integrated value calculator which calculates an output current integrated value by integrating output current values of the battery at constant time intervals from a time when the stop condition is satisfied while the normal operation diagnosis is being performed, in which the condition for performing the normal operation diagnosis includes a condition that a predetermined resumption permission time has passed since the stop condition is satisfied, and the output current integrated value reaches a predetermined resumption permission current threshold.

When the stop condition is satisfied while the normal operation diagnosis is being performed, the state of charge in the battery is high. For this reason, the condition for performing the normal operation diagnosis includes the condition that: the time length which has passed since the stop condition is satisfied reaches the predetermined resumption permission time; and the battery output current integrated value reaches the predetermined resumption permission current threshold. This makes it possible to securely avoid the repetition of the interruption and resumption of the normal operation diagnosis for a short time.

In the controller for vehicle according to the seventh aspect, a twelfth aspect of the present disclosure describes a controller for vehicle including an electric motor drive upper limit vehicle speed reducer which reduces an electric motor drive upper limit vehicle speed (VPEVU) if there is likelihood that the condition for performing the normal operation diagnosis or the condition for performing the fuel cut operation diagnosis is satisfied, in which the condition for starting the operation of the engine includes a condition that the vehicle speed (VP) is higher than the electric motor drive upper limit vehicle speed (VPEVU).

According to this configuration, if there is likelihood that the condition for performing the normal operation diagnosis or the condition for performing the fuel cut operation diagnosis is satisfied, the motor drive upper limit vehicle speed is changed to a lower vehicle speed. Thus, the vehicle speed decreases, and the condition for performing the normal operation diagnosis or the fuel cut operation diagnosis becomes unsatisfied. Thereafter, when the vehicle speed increases, the operation of the engine can be easily started. This makes it possible to resume the normal operation diagnosis or the fuel cut operation diagnosis earlier.

Obviously, numerous modifications and variations of the present invention are possible in light of the above teachings. It is therefore to be understood that within the scope of the appended claims, the invention may be practiced otherwise than as specifically described herein.

What is claimed is:
1. A controller for a vehicle, comprising:
an electronic control unit configured to:
perform a failure diagnosis of an internal combustion engine system of the vehicle while an internal combustion engine of the internal combustion engine system is in operation;

operate the internal combustion engine in a charge depleting mode operation in which an electric motor mainly moves the vehicle while the internal combustion engine is not run only for charging a battery that is configured to supply electric power to the electric motor and to be charged by at least one of the internal combustion engine and an external power supply;

run the internal combustion engine if a predetermined condition is satisfied in the charge depleting mode operation; and continue running the internal combustion engine in order to perform the failure diagnosis even if the predetermined condition is unsatisfied while the internal combustion engine is run in the charge depleting mode operation, wherein the failure diagnosis includes a normal operation diagnosis to be performed after completion of warm-up of the internal combustion engine with an output torque of the internal combustion engine set at a normal operation target torque which is larger than an output torque during the warm-up, wherein the electronic control unit is configured to calculate an output current integrated value by integrating output current values of the battery at constant time intervals from a time when a stop condition is satisfied while the normal operation diagnosis is being performed, the stop condition is satisfied when an upper limit value of output torque of the internal combustion engine becomes smaller than the normal operation target torque, and wherein the normal operation diagnosis is performed in a condition that:

a predetermined resumption permission time has passed since the stop condition is satisfied; and the output current integrated value reaches a predetermined resumption permission current threshold.

2. The controller according to claim 1, wherein the failure diagnosis is performed in a condition that: no failure diagnosis engine operation is performed during a previous driving period of the vehicle which is defined as being from the start to end of the drive of the vehicle; and the failure diagnosis is not completed.

3. The controller according to claim 2, wherein the failure diagnosis is performed in a condition that the failure diagnosis is performed during the previous driving period of the vehicle.

4. The controller according to claim 1, wherein the failure diagnosis is performed in:

a condition that a requested drive torque of the vehicle is less than a predetermined high output threshold; and a condition that no engine brake operation is requested, and the engine brake operation is an operation in which:

supply of fuel to the internal combustion engine is stopped during deceleration of the vehicle;

the electric motor is operated as a power generator; and the internal combustion engine is driven using electric power thus generated.

5. The controller according to claim 1, wherein the failure diagnosis includes a warming up diagnosis to be performed while the internal combustion engine is warming up, and a fuel cut operation diagnosis to be performed while a fuel cut operation which stops supply of fuel to the internal combustion engine is being performed after the completion of the warm-up of the internal combustion engine.

6. The controller according to claim 5, wherein the warming up diagnosis and the normal operation diagnosis are performed, respectively, in a condition that the states of charge in the battery are equal to or less than upper limit states of charge which are set corresponding to the warming up diagnosis and the normal operation diagnosis.

7. The controller according to claim 5, wherein the normal operation diagnosis and the fuel cut operation diagnosis are performed, respectively, in a condition that vehicle speeds, as running speeds, of the vehicle are equal to or greater than lower limit speeds which are set corresponding to the normal operation diagnosis and the fuel cut operation diagnosis.

8. The controller according to claim 7, wherein the electronic control unit is configured to reduce an electric motor drive upper limit vehicle speed if there is likelihood that a condition for performing the normal operation diagnosis or a condition for performing the fuel cut operation diagnosis is satisfied, and wherein, the operation of the internal combustion engine is started in a condition that the vehicle speed is higher than the electric motor drive upper limit vehicle speed.

9. The controller according to claim 5, wherein the fuel cut operation diagnosis is performed in a condition that a time length for which a fuel supply operation which supplies the fuel to the internal combustion engine is performed is equal to or greater than a predetermined minimum fuel supply operation time.

10. The controller according to claim 5, wherein the electronic control unit is configured to set an upper limit engine output torque depending on the state of charge in the battery, the upper limit engine output torque being the upper limit value of output torque of the internal combustion engine, and wherein, while the normal operation diagnosis is being performed, the normal operation diagnosis is stopped if the stop condition is satisfied.

11. The controller according to claim 10, wherein in a case where, while the normal operation diagnosis is being performed, the normal operation diagnosis is stopped because the stop condition is satisfied, the fuel cut operation diagnosis is performed if a condition for performing the fuel cut operation diagnosis is satisfied.

12. The controller according to claim 1, wherein the internal combustion engine system includes the internal combustion engine and a sensor mounted on the internal combustion engine.

13. The controller according to claim 1, wherein the predetermined condition includes a condition in which a temperature of the electric motor exceeds a temperature threshold.

14. The controller according to claim 1, wherein the predetermined condition includes a condition in which a time length for which the internal combustion engine remains out of operation exceeds a time threshold.

15. A method for controlling a vehicle, comprising:

operating an internal combustion engine of an internal combustion engine system of the vehicle in a charge depleting mode operation in which an electric motor mainly moves the vehicle while the internal combustion engine is not run only for charging a battery that is configured to supply electric power to the electric motor and to be charged by at least one of the internal combustion engine and an external power supply;

running the internal combustion engine if a predetermined condition is satisfied in the charge depleting mode operation; and continuing running the internal combustion engine in order to perform a failure diagnosis of the internal combustion engine system even if the predetermined condition is unsatisfied while the internal combustion engine is run in the charge depleting mode operation, wherein the failure diagnosis includes a normal operation diagnosis to be performed after completion of warm-up of the internal combustion engine with an output torque of the internal combustion engine set at a normal operation target torque which is larger than an output torque during the warm-up, wherein an output current integrated value is calculated by integrating output current values of the battery at constant time intervals from a time when a stop condition is satisfied while the normal operation diagnosis is being performed, the stop condition is satisfied when an upper limit value of output torque of the internal combustion engine becomes smaller than the normal operation target torque, and wherein the normal operation diagnosis is performed in a condition that:
  a predetermined resumption permission time has passed since the stop condition is satisfied; and
  the output current integrated value reaches a predetermined resumption permission current threshold.

16. The method according to claim 15, wherein the predetermined condition includes a condition in which a temperature of the electric motor exceeds a temperature threshold.

17. The method according to claim 15, wherein the predetermined condition includes a condition in which a time length for which the internal combustion engine remains out of operation exceeds a time threshold.

* * * * *